US009848459B2

(12) United States Patent
Darrow et al.

(10) Patent No.: US 9,848,459 B2
(45) Date of Patent: Dec. 19, 2017

(54) DYNAMIC NETWORK CONNECTIVITY USING UNMANNED AERIAL VEHICLES

(71) Applicant: Cisco Technology, Inc., San Jose, CA (US)

(72) Inventors: Nicholas Darrow, Atlanta, GA (US); Biren Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/092,358

(22) Filed: Apr. 6, 2016

(65) Prior Publication Data
US 2017/0295609 A1    Oct. 12, 2017

(51) Int. Cl.
 *H04W 84/18* (2009.01)
 *G05D 1/00* (2006.01)
 *G05D 1/10* (2006.01)
 *B64C 39/02* (2006.01)

(52) U.S. Cl.
 CPC .......... *H04W 84/18* (2013.01); *B64C 39/024* (2013.01); *G05D 1/0011* (2013.01); *G05D 1/104* (2013.01); *B64C 2201/122* (2013.01)

(58) Field of Classification Search
 CPC ............... H04W 84/18; B64C 39/024; B64C 2201/122; G05D 1/0011; G05D 1/104
 See application file for complete search history.

(56) References Cited

U.S. PATENT DOCUMENTS

| 2003/0164794 | A1* | 9/2003 | Haynes | H04B 1/7172 342/353 |
| 2010/0108807 | A1* | 5/2010 | Barrett | B64C 27/20 244/1 N |
| 2016/0028471 | A1* | 1/2016 | Boss | H04W 84/06 455/406 |

* cited by examiner

*Primary Examiner* — Yuen Wong
(74) *Attorney, Agent, or Firm* — Hickman Palermo Becker Bingham LLP

(57) ABSTRACT

A method for establishing an unmanned aerial vehicle (UAV) network among a plurality of UAVs that is programmed to communicate packet data, wherein the plurality of UAVs comprises a first UAV and creating a first wireless connection between the first UAV of the plurality of UAVs and a second UAV. The method includes receiving a first signal indicating that the second UAV has been added to the plurality of UAVs and transmitting a second signal to the second UAV that causes the second UAV to generate a wireless coverage area that extends a wireless range of the UAV network. The method includes calculating a plurality of link cost values for one or more wireless connections to or from each particular UAV to one or more other UAVs in the plurality of UAVs; and determining whether to realign the plurality of UAVs based on the plurality of link cost values.

20 Claims, 16 Drawing Sheets

| Link ID | TTL | Target | Direction | Transport | Base Cost | Base Mbps | Road Hops | Hops | Link Avail. % | Current Uptime | Total Uptime | Min. Uptime | Avg. Uptime | Total Downtime | PER % | Uptime % | Base Link Preference | Link Reliability | Bias Link | Ideal Preferred Link |
|---|---|---|---|---|---|---|---|---|---|---|---|---|---|---|---|---|---|---|---|---|
| Link_1 | 3600 | UAV_Node_2 | Two-way | Wi-Fi 5.8Ghz | 50 | 150 | 2 | 1 | 30% | 180 | 1180 | 5.00 | 5.00 | 2500 | 20% | 17% | 100 | 1.50 | 112.50 | 1.13 |
| Link_2 | 3600 | UAV_Node_3 | Two-way | Wi-Fi 2.4Ghz | 100 | 2 | 3 | 3 | 70% | 300 | 2520 | 5.00 | 14.00 | 1080 | 15% | 12% | 150 | 18.33 | 130.80 | 2.32 |
| Link_3 | 3600 | UAV_Node_4 | Two-way | DSRC | 150 | 12 | 1 | 1 | 20% | 540 | 720 | 9.00 | 9.00 | 2880 | 10% | 75% | 150 | 9.00 | 108.00 | 0.78 |
| Link_4 | 3600 | UAV_Node_2 | Two-way | Cellular1 | 200 | 10 | 3 | 1 | 95% | 360 | 3420 | 5.00 | 1.67 | 180 | 12% | 9% | 300 | 34.58 | 115.28 | 0.50 |
| Link_5 | 3600 | UAV_Node_3 | Two-way | Cellular2 | 200 | 10 | 5 | 2 | 70% | 60 | 2520 | 1.00 | 0.28 | 1080 | 11% | 2% | 1000 | 5.36 | 18.73 | 0.02 |
| Link_6 | 3600 | UAV_Node_4 | Two-way | Cellular3 | 200 | 1 | 1 | 3 | 15% | 405 | 540 | 6.75 | 6.75 | 3060 | 10% | 75% | 200 | 3.38 | 3.38 | 0.03 |
| Link_7 | 3600 | UAV_Node_5 | Outbound | LR 900mhz | 400 | 0.5 | 1 | 5 | 25% | 675 | 900 | 11.25 | 11.25 | 2700 | 10% | 75% | 400 | 16.88 | 8.44 | 0.08 |
| Link_8 | 3600 | UAV_Node_6 | Inbound | LR 433mhz | 500 | 0.3 | 1 | 5 | 40% | 200 | 1440 | 3.33 | 3.33 | 2160 | 10% | 24% | 500 | 10.00 | 3.00 | 0.03 |

DYNAMIC NETWORK CONNECTIVITY USING UNMANNED AERIAL VEHICLES

TECHNICAL FIELD

The present disclosure relates to improved methods, computer software, and computer hardware in the field of wireless networks. More specifically, the disclosure relates to dynamic network connectivity using unmanned aerial vehicles.

BACKGROUND

It can be challenging to quickly deploy a reliable communication network in a geographic area. Existing mobile ad hoc networks (MANETS) provide the capability to deploy a communication network; however, such communication networks do not use unmanned aerial vehicles, are protocol-specific, and cannot dynamically adjust to changes in events and conditions in the geographic area. The techniques described herein solve these problems and more.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 2 is an example of a table storing link cost data, according to one embodiment.

DESCRIPTION OF THE EXAMPLE EMBODIMENT(S)

Figure 1:
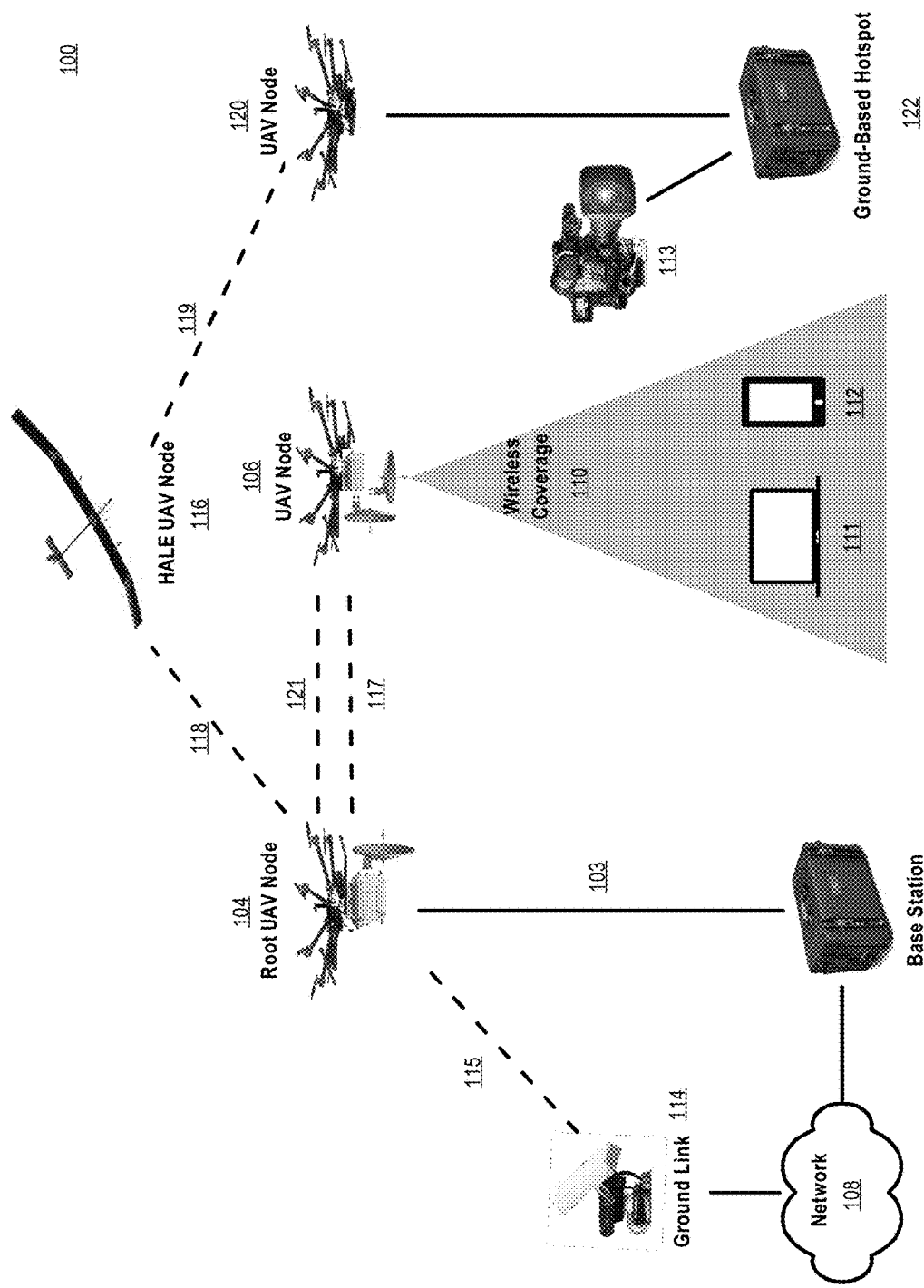
FIG. 1 is an example of a dynamic unmanned aerial vehicle (UAV) network, according to one embodiment.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s). Embodiments are described in sections according to the following outline:

1. OVERVIEW
2. EXAMPLE SYSTEM IMPLEMENTATION
3. LINK COST DATA
4. ROUTING DATA PACKET TRAFFIC THROUGH THE DYNAMIC UAV NETWORK
5. DEPLOYING A DYNAMIC UAV NETWORK
6. RECONFIGURING A DYNAMIC UAV NETWORK
7. APPLICATION EXAMPLES
8. HARDWARE OVERVIEW
9. EXTENSIONS AND ALTERNATIVES

1. Overview

Techniques are described herein for deploying and reconfiguring a dynamic UAV network using unmanned aerial vehicles (UAVs).

Mobile ad hoc networks (MANETS) provide the ability to deploy a network; however, such networks are not dynamic. In a MANET, when data transmission over a particular link or node fails to perform as expected, the data transmission will be transmitted over a second backup link instead. However, UAVs provide a capability for a more dynamic system than a traditional MANET because they allow the configuration of the entire network to be modified. UAVs are highly mobile and can be repositioned and realigned to change the topology of a network. Thus, in a dynamic UAV network according to some embodiments herein, if data transmission over a particular link fails to perform as expected, the network can dynamically readjust itself to improve the characteristics of the particular link rather than using a backup link. Furthermore, in some embodiments, the UAVs can be configured to provide a variety of connections over a variety of protocols using a variety of UAVs. Therefore, in a dynamic UAV network in one embodiment, the connections amongst nodes can be protocol and device agnostic, thereby allowing the dynamic UAV network to easily and quickly scale to provide a variety of services with different wireless capabilities.

In one embodiment, a plurality of UAVs are used to establish a UAV network among the plurality of UAVs that is programmed to communicate packet data, wherein the plurality of UAVs comprises a first UAV. A first wireless connection between the first UAV of the plurality of UAVs and a second UAV, which is different than the plurality of UAVs, is created. A first signal is received that indicates that the second UAV has been added to the plurality of UAVs. A second signal is transmitted to the second UAV that causes the second UAV to generate a wireless coverage area that extends a wireless range of the UAV network. For each particular UAV in the plurality of UAVs, plurality of link cost values for one or more wireless connections to or from each particular UAV to one or more other UAVs in the plurality of UAVs is calculated. The plurality of link cost values are used to determine whether to realign the plurality of UAVs based on the plurality of link cost values.

2. Example System Implementation

FIG. 1 illustrates an example dynamic UAV network in which the techniques described may be practiced, according to some embodiments. In the example of FIG. 1, a UAV network 100 is a network of one or more UAV nodes connected to a root UAV node. Dynamic UAV network 100 is a computer-based system and may be implemented across one or more computing devices. The various components of dynamic UAV network 100 are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. Dynamic UAV network 100 illustrates only one of many possible arrangements of components configured to execute the programming described herein. Other arrangements may include fewer or different components, and the division of work between the components may vary depending on the arrangement.

The dynamic UAV network 100 provides connectivity to one or more devices. Dynamic UAV network 100 includes multiple UAV nodes. A UAV node can be any type of UAV and the embodiments herein are device-agnostic, therefore a UAV node can be a tethered UAV, an untethered UAV, a battery operated UAV, a high altitude long endurance (HALE) UAV, a fixed wing craft, a balloon, or any other type of UAV. Dynamic UAV network 100 includes base station 102, root UAV node 104, UAV node 106, network 108, wireless coverage area 110, computing device 111, computing device 112, computing device 113, ground link 114, high altitude long endurance (HALE) UAV node 116, UAV node 120, and ground-based hotspot 122. "Dynamic," in this context, means that nodes of the network implement computer-executed processes, as further described herein, that accommodate addition, removal, or realignment of UAV nodes, changes to network or environmental conditions, and changes in the transport protocols, types of wireless connections, and other networking or internetworking parameters or values that govern communication of voice, video, or data between the UAV nodes, continuously while the UAV nodes are operating in the air or on the ground. Base station 102 is a computing device that is communicatively connected to network 108. Network 108 may be any public network, such as the Internet, or any private network. Although depicted as a single device, base station 102 may include multiple devices in one or more locations. In one embodiment, base station 102 is connected to network 108 via a wired connection, such as an Ethernet or Fiber cable. In another embodiment, base station 102 is connected to network 108 via a wireless connection. For example, base station 102 may include a satellite dish and may be connected to network 108 via satellite uplink transmission.

Base station 102 is communicatively connected to root UAV node 104 via connection 103. Root UAV node 104 is a UAV node that serves as a root node for the dynamic UAV network 100. Root UAV node 104 may communicate with network 108 via base station 102 and relay information to and from the rest of the dynamic UAV network 100. In one embodiment, root UAV node 104 is a tethered UAV that is communicatively connected to base station 102 via a connection 103 that is a wired tether. By using a tethered UAV, the dynamic network 100 ensures that the root UAV node of the network has a consistent and reliable connection to network 108, thereby improving the stability, reliability, and throughput of the entire dynamic UAV network 100. Additionally, by using tethered UAV, root UAV node 104 can ensure it has communication with network 108 even if it does not have line of sight to the base station 102. This is particularly helpful in cases where weather, buildings, or other obstructions may block line of sight to the base station. In another embodiment, root UAV node 104 is an untethered UAV that is communicatively connected to base station 102 via a connection 103 that is a wireless connection. In one embodiment, dynamic UAV network 100 may include multiple root UAV nodes if there are multiple UAVs that have a reliable connection to network 108 via a base station 102.

Different types of data may be transmitted via connections in the dynamic UAV network 100 and may include critical data and bandwidth data. Critical data is data that one or more UAV nodes require for basic functioning of the dynamic UAV network 100. For example, critical data may include data that must be transmitted in real-time, such as command and control data for a UAV node or telemetry data for a UAV node. Bandwidth data is data that is transmitted in the dynamic UAV network that requires high bandwidth, and may include all data that is not classified as critical data. For example, bandwidth data may include voice data, HTTP data, image data, etc.

In one embodiment, the connection 103 between base station 102 and root UAV node 104 is only used for bandwidth data and not critical data. Ground link 114 may be communicatively connected to root UAV node 104 directly via a connection 115 that may be implemented as a wireless connection. Connection 115 may be used to send critical data back and forth between ground link 114 and root UAV node 104.

Dynamic UAV network 100 includes one or more UAVs connected to root UAV node 104, either directly or indirectly. For example, root UAV node 104 is communicatively connected to UAV node 106 via connection 117 and connection 121. Likewise, root UAV node 104 is connected to high altitude long endurance (HALE) UAV node 116 via connection 118. HALE UAV node 116 is connected to UAV node 120 via connection 119. Although HALE UAV node 116 is included in dynamic UAV network 100, a HALE UAV node is not required to practice the techniques described herein. Each of root UAV node 104, UAV node 106, HALE UAV node 116, and UAV node 120 is a UAV node in the dynamic UAV network 100. Each of the UAV nodes can be connected to one or more UAV nodes in the dynamic UAV network 100 via one or more connections.

Each of the connections 103, 115, 117, 118, 119, and 121 can be implemented as either a bidirectional connection or a unidirectional connection. A unidirectional connection allows a node to transmit data in the blind (one-way) and may be particular useful for protocols that have a long range and limited throughput, such as long range (LR) 900 MHz radio or long range (LR) 433 MHz radio. Additionally, each of the connections 103, 115, 117, 118, 119, and 121 can be implemented via a different communication protocol. For example, connection 103 can be implemented as a tethered Ethernet/Fiber connection, connections 115 and 121 can be implemented as a Wi-Fi connection, connection 117 can be implemented as a LTE cellular connection, and connections 118 and 119 can be implemented as a long range radio connection. The use of mixed protocols allows the dynamic UAV network to be protocol-agnostic. The use of mixed protocols allows different types of data to be transmitted over different types of connections. For example, data transmissions that require high bandwidth, such as video streaming, can be transmitted over connections that provide higher bandwidth, while data transmissions that do not require high bandwidth, such as emails, can use a lower bandwidth connection. Additionally, lower bandwidth connections typically have longer ranges and will allow the dynamic UAV network 100 to cover a larger region than high bandwidth connections which typically have shorter ranges. Furthermore, the use of mixed protocols allows the dynamic UAV network 100 to dynamically reconfigure itself to changes in conditions, such as weather conditions or a lost UAV node. Additionally, the use of mixed protocols allows different connections to have different characteristics (for example range and bandwidth). A connection can be implemented as any known wireless or wired protocol, including, but not limited to, Ethernet/Fiber, Wi-Fi (802.11 a/b/c/g/n/ac), dedicated short-range communications (DSRC), LR 900 MHz radio, LR 433 MHz radio, Bluetooth, WiMax, optical, or various cellular protocols such as LTE, HSPA+, GSM, CDMA, or 3G. In one embodiment, a software defined radio (SDR), which is not bound to a specific protocol or frequency, is used for a connection and allows the UAV node to be protocol-agnostic. In one embodiment, multiple connections between two UAV nodes can be implemented with the same protocol to provide redundancy.

Any UAV node in the dynamic UAV network 100 can provide a wireless coverage area, which is an area of coverage that provides wireless connectivity. For example, UAV node 106 may provide wireless coverage area 110. Wireless coverage area 110 can provide wireless connectivity to the dynamic UAV network 100 for one or more devices on the ground or in the air using any wireless protocol. For example, wireless coverage area 110 may be implemented as Wi-Fi, cellular service, or Bluetooth. Wireless coverage area 110 can provide aerial coverage or ground coverage. In dynamic UAV network 100, wireless coverage area 110 provides ground coverage to devices 111 and 112. Devices 111 and 112 can be any computing devices capable of wireless communication via the protocol of wireless coverage area 110. For example, devices 111 and 112 could include one or more smartphones, tablets, computers, GPS devices, camera devices, etc. Thus, UAV node 106 extends the wireless coverage area of the dynamic UAV network 100. Devices 111 and 112 can communicate with network 108 via UAV node 106, root UAV node 104, and base station 102.

In one embodiment, UAV node 120 is communicatively connected to ground-based hotspot 122. UAV node 120 can be implemented as either a tethered UAV or an untethered UAV. Ground-based hotspot 122 is a computing device that can provide a wired connection to one or more additional devices 113. Device 113 can be any computing device, including a smartphone, tablet, computer, GPS device, camera device, etc. Device 113 can thus communicate with network 108 via dynamic UAV network 100.

In one embodiment, the dynamic UAV network 100 may include a leader node (not depicted) that is capable of analyzing the state of the dynamic UAV network 100 and/or sending instructions or realignment plans to one or more UAV nodes of the dynamic UAV network 100. In one embodiment, the leader node can determine when to execute a realignment plan, as will be described. The leader node may be any UAV node in the dynamic UAV network 100 such as root UAV node 104, any of the UAV nodes 106 or 120, or HALE UAV node 116. In one embodiment, the leader node is the root UAV node that has the longest uptime in the dynamic UAV network 100. In one embodiment, the leader node is the root UAV node that has the strongest or most reliable connection to the network 108. In one embodiment, the leader node is the UAV node that has the most connections to other UAV nodes. In one embodiment, the leader node is preconfigured at the time of deployment of the dynamic UAV network 100. In another embodiment, the leader node may be dynamically selected by the UAV nodes in the dynamic UAV network whenever there is a change to the topology of the dynamic UAV network, such as an added or dropped link or a repositioned UAV node.

In one embodiment, the dynamic UAV network 100 may include a realignment controller (not depicted) that is capable of analyzing the state of the dynamic UAV network 100 and determine a realignment plan for the dynamic UAV network 100. In one embodiment, the realignment controller is the leader node. In another embodiment, the realignment controller is base station 102. In another embodiment, the realignment controller is a computing device or a cloud-based server coupled to network 108. Implementing the realignment controller as a computing device or a cloud-based server coupled to network 108 may be beneficial because it allows for the realignment controller to analyze the state of the dynamic UAV network 100 and determine a realignment plan even if all of the UAV nodes of the dynamic UAV network 100 have been disabled. In one embodiment, the realignment controller is software programmed on a computing device.

In one embodiment, each UAV node in the dynamic UAV network 100 is equipped with a long-range, low-frequency, and low-throughput communication method, such as LR 900 MHz radio or LR 433 MHz radio, to help other UAV nodes identify and locate it in order to create a new connection.

3. Link Cost Data

Each UAV node in a dynamic UAV network 100 may store and manage a set of link cost data. Link cost data may comprise data regarding the characteristics of the UAV node and the characteristics of each of the connections coming into and/or going out of the UAV node. As will be described herein, each UAV node's set of link cost data can be shared with other UAV nodes in the dynamic UAV network 100 or with the realignment controller of the dynamic UAV network. Link cost data can be used to deploy the dynamic UAV network, route traffic through the dynamic UAV network, and reconfigure the dynamic UAV network. Although link cost data is described herein as a table, the concepts described do not necessarily require a table implementation and can be implemented in any sort of data structure or format.

FIG. 2 is an example of a table storing link cost data 200 for a hypothetical UAV node named "UAV_Node_1" in a dynamic UAV network. Each row in link cost data 200 provides link cost data regarding a link in the dynamic UAV network. A link is a representation of a connection coming into and/or going out of a UAV node. Thus, in link cost data 200 each row represents a link between UAV_Node_1 and another device in the dynamic UAV network, such as another UAV node, a base station, or a ground link. Each column of link cost data 200 shows a type of link cost data, and each entry shows an exemplary value. Link cost data 200 includes exemplary types of link cost data, however, they are not all required. Additional types of link cost data that are not depicted may additionally be included. Some values in link cost data 200 are determined based on characteristics of a link or characteristics of a UAV. Some values of link cost data 200 are determined based on settings that are preconfigured or dynamically updated by the leader node or realignment controller. Some values in link cost data 200 are determined based on calculations performed by the UAV node on other values in the link cost data.

Link cost data 200 may include a link ID value that represents a unique identifier for a given link in the dynamic UAV network. Link cost data 200 may include a total flight time (TFT) value that represents the total amount of time that UAV_Node_1 has been in flight. As shown in link cost data 200, the TFT should be the same for all links for UAV_Node_1. Link cost data 200 may include a target value that indicates a unique identifier for the device connected to UAV_Node_1 via the given link. Thus, the row for Link_1 represents a link between UAV_Node_1 and UAV_Node_2.

The direction value indicates what direction the given link provides data transmission for, such as bidirectional ("Two-way"), unidirectional outbound ("Outbound") or unidirectional inbound ("Inbound"). The transport value indicates what protocol a given link is implemented as. For example, Link_1 is implemented as a Wi-Fi 5 GHz link.

Link cost data 200 may include a base cost value that represents a fixed base cost associated with a preference and/or a protocol range for a given protocol specified by the transport value for the link. For example, in in the example of link cost data 200, a lower base cost indicates that the transport protocol is more preferred but has a shorter range whereas a higher base cost indicates that the transport protocol is less preferred but has a longer range. The base cost cast be configured and adjusted based on the design and/or deployment of the dynamic UAV network. In one embodiment, the base cost is preconfigured before the deployment of the dynamic UAV network.

Link cost data 200 may include a base mod value that represents a modifier to the base cost that dynamically weighs additional parameters in real-time that can affect the base cost. These parameters can include data collected by UAV nodes in the dynamic UAV network or data received from a network 108. For example, these parameters may include the GPS geolocation of a node, sensor data (for example sensor data that is detecting channel interference, temperature sensor), flight data, and other non-link related metrics. In an embodiment, the parameters used to determine a base mod could include data received from neighboring UAV nodes. For example, UAV_Node_1 can receive parameters from neighboring nodes that indicate that the neighboring nodes are configured to use a particular transport protocol. Accordingly, in one embodiment, UAV_Node_1 may modify the base mod based on the parameters to favor a particular transport protocol for consistency across the network. Alternatively, UAV_Node_1 may modify the base mod based on the parameters to disfavor a particular protocol in order to improve redundancy in the dynamic UAV network. One or more of these parameters may be combined to determine a base mod. In one embodiment, a higher base mod will cause a link to be more preferred in the dynamic UAV network, and a lower base mod will cause a link to be less preferred in the dynamic UAV network. In one embodiment, the base mod of a link in link cost data is modified by the UAV node itself. In another embodiment, the base mod of a link in link cost data is modified by the leader node of the dynamic UAV network. In another embodiment, the base mod of a link in link cost data is modified by realignment controller of the dynamic UAV network. In another embodiment, the base mod of a link in link cost data is modified by a user administrator of the dynamic UAV network.

Link cost data 200 may include a megabits per second (Mbps) value that represents a bitrate of transport for a link. The Mbps value can be adjusted in real-time based on actual connection speeds measured over the link and/or via connection speed tests.

Link cost data 200 may include a roam value that represents the number of times that the target device has disconnected and reconnected a particular link in a prior period of time. In one embodiment, the prior period of time is configured as 15 minutes. Therefore, in the example of link cost data 200, the Link_1 link between UAV_Node_1 and UAV_Node_1 has disconnected and reconnected two times in the prior 15 minutes. A link to a target UAV that is moving will likely have a higher roam value as it will be dropping and reconnecting as the target UAV is repositioning itself. This may be indicative that the connection to the UAV is less stable at the current time.

Link cost data 200 may include a hops value that indicates the number of links (or "hops") that need to be passed through in order to reach a root UAV node. For example, in link cost data 200, Link_1 will require transmitting data over one additional link further downstream to reach the root UAV node, whereas Link_3 will require transmitting data over three additional links further downstream to reach the root UAV node.

Link cost data 200 may include a "link avail. %" value that represents the percentage of time the link has been available during the TFT of the UAV_Node_1. Link cost data 200 may include a current uptime value that represents the amount of time that the current link has been up. In one embodiment, the current uptime value is represented in seconds. Link cost data 200 may include a total uptime value represents the total combined amount of time that the link has been up since the UAV_Node_1 began its flight. In one embodiment, the total uptime value is represented in seconds. Link cost data 200 may include a min. uptime value that represents the current uptime in minute format. Thus, the min. uptime can be calculated as follows: current uptime/60. Link cost data 200 may include an avg. uptime value that represents the average amount of time that can be expected from a particular connection over the link. In one embodiment, the avg. uptime value is calculated in minute format. Thus, in one embodiment, the avg. uptime can be calculated as follows: (total uptime/roam)/60. Link cost data 200 may include a total downtime value that represents the total amount of time during the TFT that the link has been down. Thus, in one embodiment, the total downtime can be calculated as follows: TFT—total uptime. Link cost data 200 may include a "PER %" value that represents the packet error rate for the given link. Packet error rate is a measure of the percentage of frames and/or packets that are retransmitted, damaged, or not received over a given link.

Link cost data 200 may include an "Uptime %" value that represents the percentage of total time that the current connection has been up and available. Thus, in one embodiment, the uptime % value can be calculated as follow: current uptime/total uptime. The uptime % value provides an indication as to how stable and/or reliable the current connection is relative to the overall history of the link.

Link cost data 200 may include a raw link preference value that indicates the UAV node's preference for using a particular link by the UAV node without considering link cost data values related to uptime of the link or Mbps throughput of the link. The raw link preference may be determined based on the base cost and base mod. Thus, in one embodiment, raw link preference may be calculated as follows: (base cost*roam)/base mod. Each UAV node may have its own unique raw link preference values for each of its links. In one embodiment, the raw link preference value may be preconfigured and stored on the UAV node. In another embodiment, the raw link preference value may be dynamically determined by the leader node and sent to the UAV node. In another embodiment, the raw link preference value may be dynamically determined by the realignment controller and sent to the UAV node. In one embodiment, a lower raw link preference indicates that the link is more preferred for data transmission and a higher raw link preference indicates that the link is less preferred for data transmission.

Link cost data 200 may include a link reliability value that represents how reliable a link is based on one or more link characteristics as specified by link cost data. In one embodiment, the link reliability can be calculated as follows: ((link avail. %−PER %)*min. uptime)/(PER %). In one embodiment, a higher link reliability value indicates that the link is more reliable, and a lower link reliability value indicates that a link is less reliable. The link reliability value can be used to identify a particular link to use for critical data, which typically requires a reliable link. Link reliability values can also be used to help determine an ideal preferred link for data transmission.

Link cost data 200 may include a bandwidth (BW) link value that represents how much data can be transported over a link based on one or more link characteristics as specified by link cost data and can be used as a proxy for expected relative bandwidth. In one embodiment, the BW link can be calculated as follows: (link reliability*Mbps)/(Roam). In another embodiment, the BW link can be calculated as follows: (link reliability*Mbps)/(Roam/hops). Thus, in one embodiment, a higher BW link value indicates that the particular link is more preferred for sending a large quantity of data, and a lower BW link value indicates that the particular link is less preferred for sending a large quantity of data. In one embodiment, the BW link value is used for determining a link to use for the transmission of data that requires high throughput (for example data that is not command and control data or telemetry data). In particular, BW link can be used to identify a link that can be used for transmitting bandwidth data.

Link cost data 200 may include an ideal preferred link value that represents a rating of the hypothetical ideal link to for the UAV node to use for transporting data as determined based on link cost data. The UAV node can use the various ideal preferred link values to determine a priority order for using links for data transmission. In one embodiment, the ideal preferred link is determined based on the raw link preference, the link reliability, and/or the BW link. For example, in one embodiment, the ideal preferred link value can be calculated as follows: (link reliability*BW link)/raw link preference. In one embodiment, a higher ideal preferred link value indicates that the particular link is more preferred to use for the transport of data, and a lower ideal preferred link value indicates that a particular link is less preferred to use for the transport of data. Thus, in the example of link cost data 200, the highest ideal preferred link value in the link cost data is 2.32 for Link_2, therefore, Link_2 would ideally be used as the primary link for data transport for UAV_Node_1. If UAV_Node_1 is unable to transport over Link_2 (for example, if Link_2 goes down), then UAV_Node_1 would move on to the next highest ideal preferred link value to determine a backup link to use for the transport of data. In this example, the backup link would be Link_2. Thus the sorted order of ideal preferred link values provides a priority order for links to use for the transport of data.

In one embodiment, a UAV node will use the ideal preferred link value to transmit both critical data and bandwidth data. If the link with the optimal ideal preferred link value fails, the UAV node can decide to change its configuration. For example, in one embodiment, after a first ideal preferred link fails, the UAV node can begin transmitting critical data via the link with the optimal link reliability value, and can begin transmitting bandwidth data via the link with the next highest ideal preferred link value.

In one embodiment, each UAV node in a dynamic UAV network determines its own link cost data in real-time. In one embodiment, each UAV node in a dynamic UAV network shares its link cost data with all neighboring UAV nodes in the dynamic UAV network. In one embodiment, each UAV node in a dynamic UAV network shares its link cost data with all other UAV nodes in the dynamic UAV network. Thus, each UAV node will have the link cost data for every other UAV node in the dynamic UAV network. In one embodiment, each UAV node will share its link cost data with the leader node. In another embodiment, each UAV node will share its link cost data with the realignment controller. In one embodiment, link cost data is itself a type of critical data. In another embodiment, link cost data is itself a type of bandwidth data.

Although the link cost data 200 provides examples of types of link data that can be used, additional types of link data may exist that may be helpful for deploying a dynamic UAV network, routing data packet traffic, and/or realigning the dynamic UAV network. For example, link cost data may include a UAV node's GPS location, a UAV node's altitude, a UAV node's orientation, latency, time to acquire, channel interference, current weather conditions (for example, wind speed, rain, temperature, fog, storm, etc.), future weather conditions (for example, incoming rain, wind, cloud cover, cold, heat, etc.), link spectrum, packet size, link quality, signal strength, noise level across all channels, data rate, retry rate, collision, connection variance, latency, network utilization, client density, historic conditions, time of year (for example, leaves on trees or no leaves on trees), environmental changes or events (for example, emergency disaster, festival event, sporting event, etc.), road traffic, air traffic, etc.

4. Routing Data Packet Traffic Through the Dynamic UAV Network

A UAV node can use link cost data to determine how to route a data packet or a stream of data packets through the dynamic UAV network, for example, by routing packets toward paths that have the least cost.

In one embodiment, a UAV node only stores and manages its own link cost data. The UAV node can then determine which link to use for the transmission of a data packet based on one or more of the link reliability value, BW link value, and/or ideal preferred link value from its own link cost data. In one embodiment, the UAV node is programmed to determine whether to use link reliability, BW link, or ideal preferred link based on the type of data packet that is to be forwarded. For example, if the packet comprises latency-sensitive data or bandwidth-sensitive data, then different forwarding policies can be applied.

In one embodiment, a UAV node stores and manages its own link cost data and the link cost data of its neighboring UAV nodes. The UAV node can then determine which link to use for the transmission of a data packet based on one or more of link reliability, BW link, and/or ideal preferred link of its own link cost data and/or the link cost data of its neighboring UAV nodes. In one embodiment, the UAV node is programmed to determine whether to use link reliability, BW link, or ideal preferred link based on the type of data packet that is being transmitted for example. For example, if the packet comprises latency-sensitive data or bandwidth-sensitive data, then different forwarding policies can be applied.

In one embodiment, a UAV node stores and manages the link cost data for all or substantially all of the UAV nodes in the dynamic UAV network. The UAV node can thus use a graph traversal algorithm to determine the best route for transmitting a data packet to a root UAV node, based on the link cost data. For example, UAV node can create a graph representation of the dynamic UAV network, wherein each UAV node is represented as a vertex in the graph, and each link is represented as an edge in the graph. Each graph edge can be weighted based on one or more of link reliability, BW link, and/or ideal preferred link. In one embodiment, the UAV node is programmed to determine whether to use link reliability, BW link, or ideal preferred link based on the type of data that is being transmitted (for example critical data or bandwidth data). The UAV node can then use one of any graph traversal algorithms to determine a shortest path to use as a route to transmit the data packet. Examples of shortest path graph traversal algorithms include Dijkstra's algorithm, Flloyd-Warshall algorithm, or Johnson's algorithm, however, many other such algorithms exist as well. The UAV node can then transmit the data packet to the next UAV node in the route, as determined by the shortest path graph traversal algorithm.

In one embodiment, a data packet that is routed via the dynamic UAV network is encrypted. In one embodiment, a data packet is encrypted with a shared key encryption algorithm. In another embodiment, a data packet is encrypted with a cloud synchronized rotating key.

In one embodiment, a route for transmitting a data packet through the dynamic UAV network is determined, in part, based on a characteristic of the data packet, where a characteristic can be a classification of the data packet (for example voice data, image data, web browsing, video data, etc.), or another feature of the data pack (for example user, geographic location of the origin, geographic location of the destination, a data packet flag, or the amount of failures of previous similar data packets. In another embodiment, these same characteristics can be used to prioritize certain data packets for faster transmission over the dynamic UAV network.

In one embodiment, a route for transmitting a data packet through the dynamic UAV network is determined by the realignment controller. In another embodiment, a route for transmitting a data packet through the dynamic UAV network is determined by a cloud server coupled to a network.

5. Deploying a Dynamic UAV Network

Figure 3A:
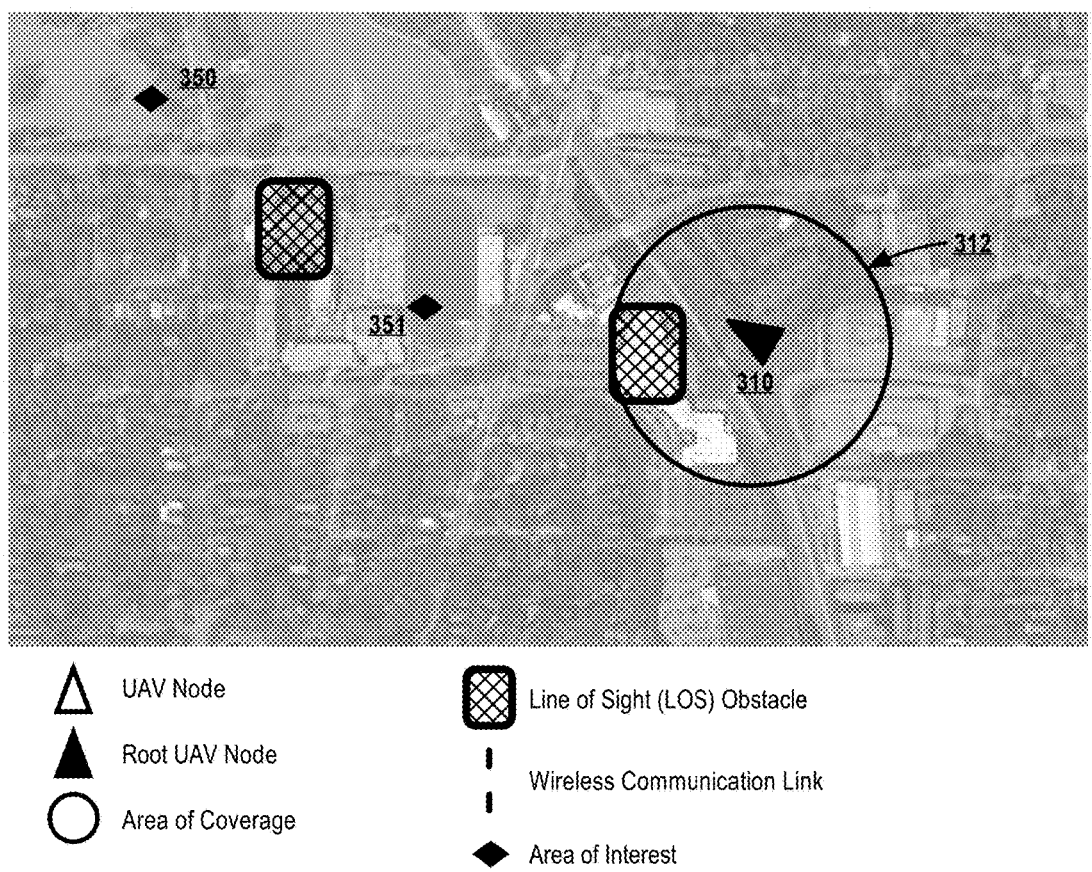
FIG. 3A, FIG. 3B, FIG. 3C, FIG. 3D show an aerial depiction of deploying a dynamic UAV network, according to one embodiment.

FIG. 3A, FIG. 3B, FIG. 3C, FIG. 3D show an aerial depiction of deploying a dynamic UAV network according to one embodiment. FIG. 3A depicts the initial deployment of a dynamic UAV network. A root UAV node 310 is launched. The root UAV node 310 is connected to a network via a base station (not depicted). The root UAV node 310 provides a wireless area of coverage 312. Thus, the initial dynamic UAV network includes root UAV node 310 and area of coverage 312. The aerial map indicates two areas of interest 350 and 351. An area of interest is a location that the dynamic UAV network will attempt to provide and maintain coverage for. For example, in the case of an emergency disaster, an area of interest may be a site of a news crew or a location of a headquarters for first responders.

Figure 3B:
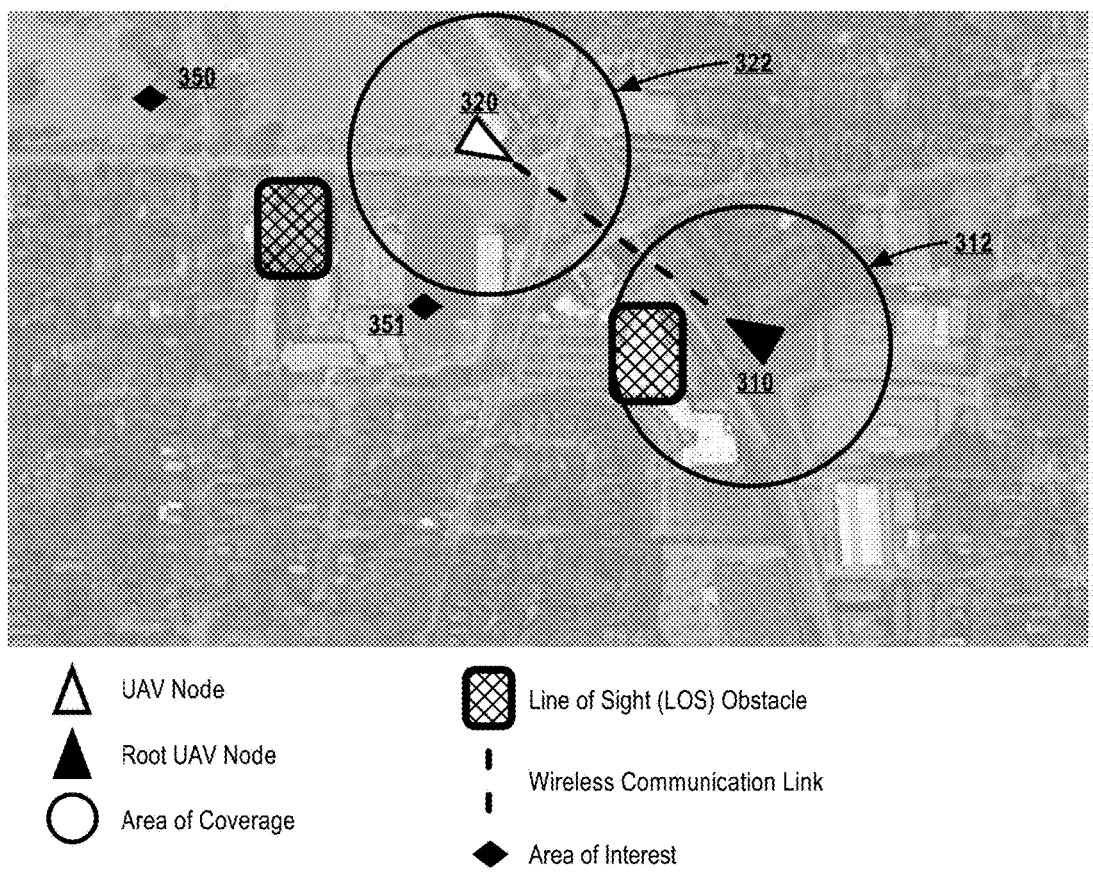

In FIG. 3B, an additional UAV node 320 has been launched. The UAV node 320 has established one or more links to root UAV node 310. The UAV node 320 has been positioned appropriately to account for line of sight obstacles that may interfere with a wireless connection to root UAV node 310. The UAV node 320 provides wireless area of coverage 322. Thus, after deploying UAV node 320, the dynamic UAV network has been extended and now includes root UAV node 310, UAV node 320, and areas of coverage 312 and 322.

Figure 3C:
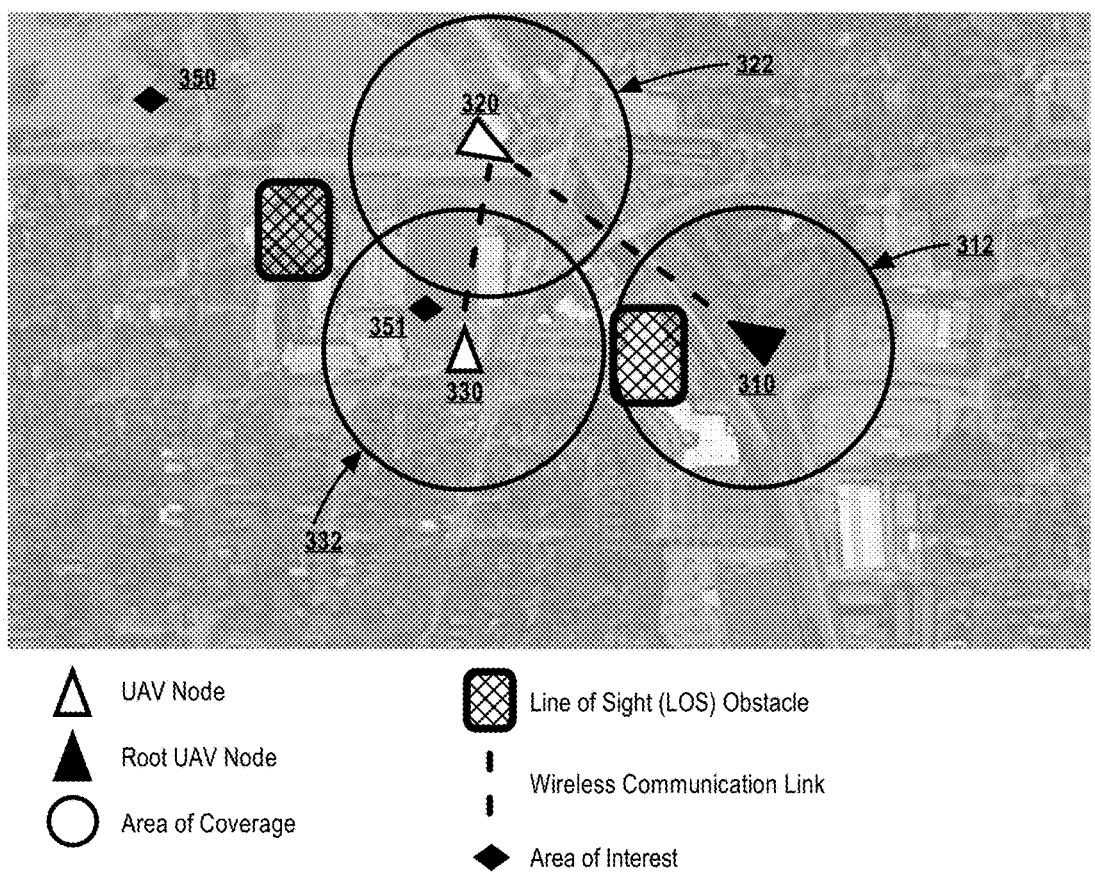

In FIG. 3C, an additional UAV node 330 has been launched. The UAV node 330 has established one or more links to UAV node 320. The UAV node 330 provides wireless area of coverage 332. The UAV node 330 has been positioned so that area of coverage 332 provides connectivity to area of interest 351. Thus, after deploying UAV node 330, the dynamic UAV network has been extended and now includes root UAV node 310, UAV nodes 320 and 330, and areas of coverage 312, 322, and 332.

Figure 3D:
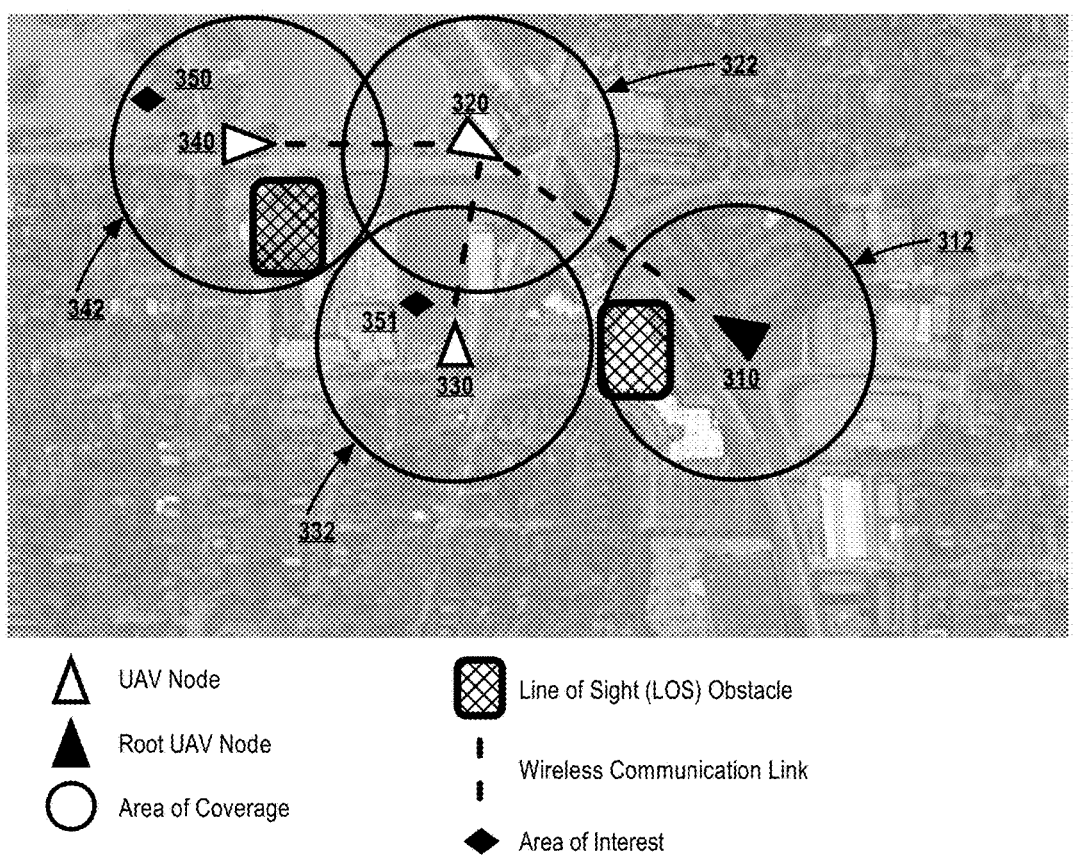

In FIG. 3D, an additional UAV node 340 has been launched. The UAV node 340 has established one or more links to UAV node 320. The UAV node 340 provides wireless area of coverage 342. The UAV node 340 has been positioned so that area of coverage 342 provides connectivity to area of interest 350. Thus, after deploying UAV node 340, the dynamic UAV network has been extended and now includes root UAV node 310; UAV nodes 320, 330 and 340; and areas of coverage 312, 322, 332, and 342. In one embodiment, root UAV node 310, and UAV nodes 320, 330, and/or 340 can be different types of UAVs. For example, root UAV node 310 may be a tethered UAV, and UAV node 320 may be a HALE UAV. In one embodiment, the protocols for the links between root UAV node 310, and UAV nodes 320, 330, and/or 340, may be different, thereby allowing the dynamic UAV network to be protocol-agnostic and also allowing the various links in the dynamic UAV network to have different communication characteristics based on the protocols used.

Figure 4:
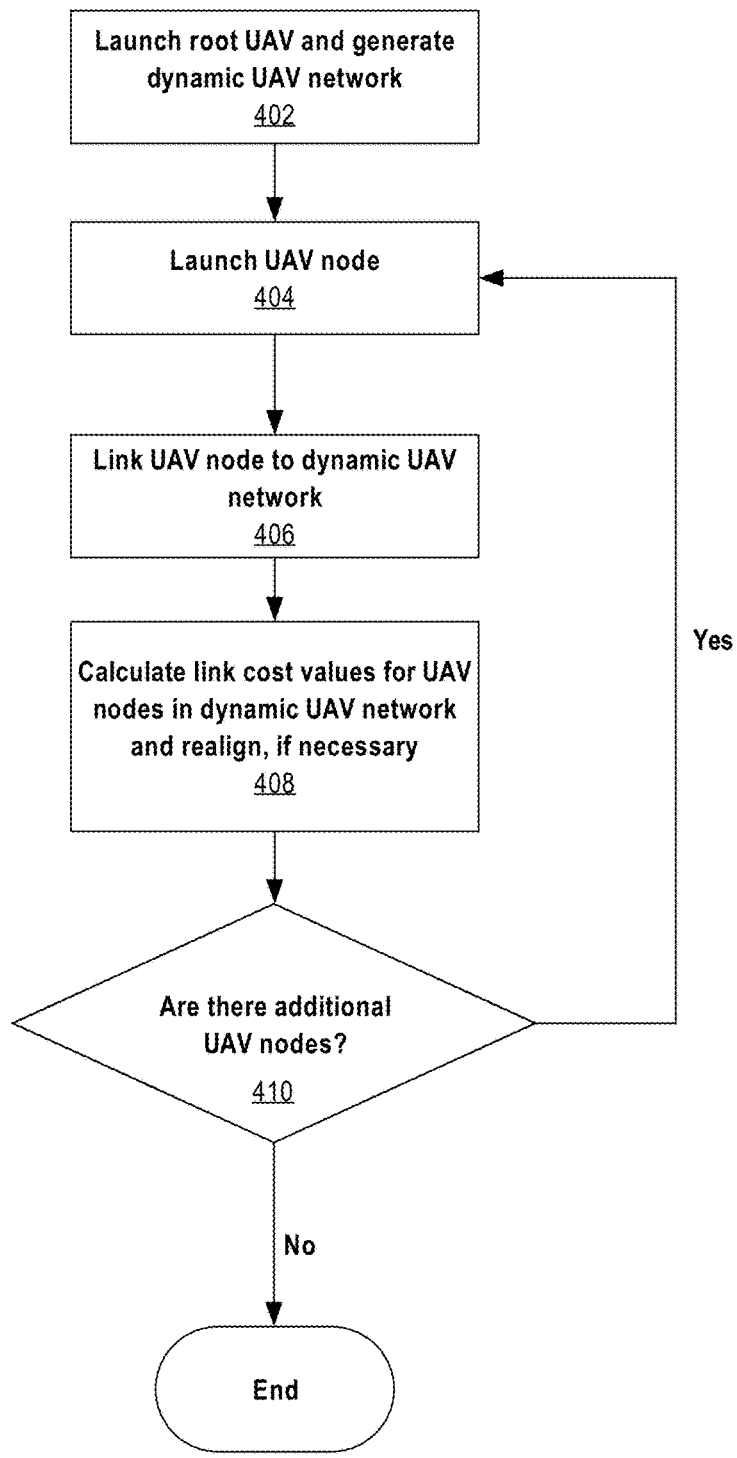
FIG. 4 is a flow diagram for a process of deploying a dynamic UAV network, according to one embodiment.

FIG. 4 shows an example flow diagram for a process 400 of deploying a dynamic UAV network. In step 402, a root UAV is launched and generates a dynamic UAV network. The root UAV is communicatively connected to a base station and a network. In one embodiment, the root UAV is a tethered UAV that is connected to a base station via a wired tether. In one embodiment, the root UAV generates a wireless coverage area that has a range. In one embodiment, the root UAV node is the leader node of the dynamic UAV network.

In step 404, a UAV node is launched. In one embodiment, when a UAV node is launched, the UAV node transmits a signal or message to indicate that the UAV node is launched. This signal or message may be transmitted to the root UAV, to one or more additional UAV nodes in the dynamic UAV network, to the base station, or to a realignment controller.

In step 406, the UAV node launched in step 404 is connected to the dynamic UAV network via one or more links. The one or more links may be to one or more UAV nodes that already exist in the dynamic UAV network, including the root UAV node. The one or more links may be implemented as a wireless connection. The one or more links may be implemented in one or more protocols, thereby allowing the dynamic UAV network to be protocol-agnostic. In one embodiment, when a link is created between UAV node and the dynamic UAV network, the UAV node sends a signal or set of instructions to the dynamic UAV network to indicate that the UAV node has been added to the dynamic UAV network. In one embodiment, the UAV node generates a wireless coverage area in response to a signal or set of instructions received by the UAV node. The UAV node thus extends the range of the dynamic UAV network by generating a wireless coverage area.

In step 408, each UAV node in the dynamic UAV network calculates a link cost data for itself and shares its link cost data with the other nodes in the dynamic UAV network. The link cost data for the dynamic UAV network are sent to a realignment controller. In one embodiment, the realignment controller is a cloud-based server. In one embodiment, the realignment controller of the dynamic UAV network determines whether one or more UAV nodes need to be realigned. For example, the realignment controller may determine that one or more UAV nodes need to be realigned in order to improve the link cost data values for one or more links, or the realignment controller may determines that one or more UAV nodes need to be realigned in order to ensure wireless coverage for an area of interest. The realignment controller may devise a realignment plan for realigning the dynamic UAV network, as will be described later. The realignment controller may then send the realignment plan to each of the nodes of the dynamic UAV network. The nodes can then execute the realignment plan to reposition and realign themselves in accordance with the realignment plan. In one embodiment, a realignment plan is only executed when network traffic permits, as determined by the leader node. Thus, the realignment plan may be halted until an appropriate time to execute it.

In step 410, the process determines whether there are additional UAV nodes that need to be deployed. If there are additional UAV nodes that need to be deployed, the process may return to step 404. If there are no additional UAV nodes that need to be deployed, the process may end.

6. Reconfiguring a Dynamic UAV Network

Figure 5:
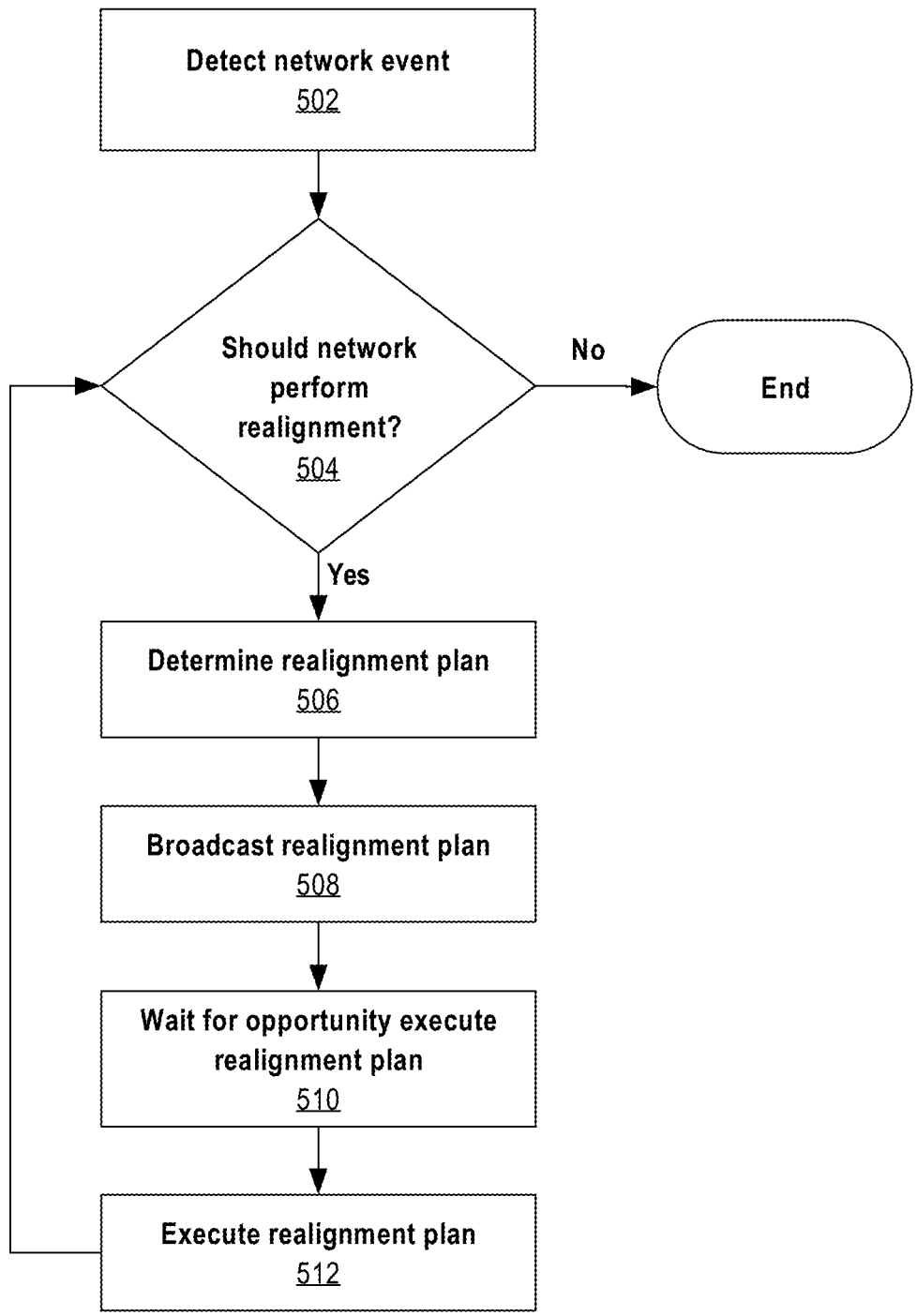
FIG. 5 is a flow diagram for a process of reconfiguring a dynamic UAV network, according to one embodiment.

FIG. 5 shows a flow diagram for a process 500 for reconfiguring a dynamic UAV network. In step 502, a network event is detected by the realignment controller. A network event can be any event that affects one or more link cost data values for one or more UAV nodes in the dynamic UAV network. Examples of possible network events include, but are not limited to: adding a UAV node to the dynamic UAV network, adding a new connection between two UAV nodes, dropping a UAV node from the dynamic UAV network, dropping a connection between two UAV nodes, or any changes to a characteristic of a link that may affect a link cost data value, such as increased/decreased bitrate, increased/decreased signal strength, weather conditions detected at a location, line of sight obstacles detected, etc. A network event can be generated by any UAV node in the dynamic UAV network, the realignment controller, or by an external source. For example, a weather forecast report from a third party weather service can comprise an external sources. A network event can also be a new external criterion for the dynamic UAV network, such as an identification of a new desired area of interest to receive wireless coverage.

In step 504, the realignment controller determines whether it should perform a realignment of the dynamic UAV network. In one embodiment, the realignment controller compares one or more link cost data values to one or more threshold settings that are preconfigured. If the one or more link cost data values do not satisfy the one or more threshold settings, the realignment controller will perform a realignment of the dynamic UAV network. If all of the link cost data values do satisfy the one or more threshold settings, the realignment control will determine that it will not perform a realignment of the dynamic UAV network. In one embodiment the one or more threshold settings can be configured to be specific to a characteristic of the type of data packets being transmitted (for example video data, voice data, or the specific user sending the data, the geographic location of the sending user, critical data, bandwidth data, etc.) over the link. In another embodiment, the realignment controller determines whether all areas of interest have a required amount of coverage. If all areas of interest do not have a required amount of coverage, the realignment controller will determine that it will perform a realignment. If all areas of interest do have a required amount of coverage, the realignment controller will not perform a realignment. In one embodiment, the realignment controller determines whether one or more UAV nodes are at risk (for example from a weather condition or other external factor). If one or more UAV nodes are at risk, the realignment controller determines that it will perform a realignment. If none of the UAV nodes are at risk, the will not perform a realignment. In one embodiment, the realignment controller determines whether the coverage area and/or bandwidth of the dynamic UAV network is maximized. If the coverage area and/or bandwidth of the dynamic UAV network is not maximized, the realignment controller will perform a realignment. If the coverage area and/or bandwidth of the dynamic UAV network is maximized, the realignment controller not perform a realignment. If the realignment controller determines that it will not perform a realignment, the process 500 may end. If the realignment controller determines that will perform a realignment, the process 500 may proceed to step 506.

In step 506, the realignment controller will determine a realignment plan. A realignment plan is a plan to reconfigure the topology of the dynamic UAV network. The realignment plan can be determined based on the network event in order to correct any issues presented by the network event. In another embodiment, the realignment plan can be determined in order to maximize a characteristic of the dynamic UAV network, such as area of coverage or bandwidth.

A realignment plan may include realignment instructions for one or more UAV nodes, including instructions that instruct one or more UAV nodes to change its position, altitude, orientation, connections with other UAV nodes, connection protocols used, configurable link cost data, and/or any other characteristic of the UAV node that can be programmed via an instruction. In one embodiment, a realignment plan may include realignment instructions for scanning for a neighboring UAV node that is lost based on the last known position and altitude of the neighboring UAV node. In one embodiment, each UAV node is equipped with a long-range, low-frequency, and low-throughput communication method to aid in discovery via such scanning. This communication method can be used to transmit variables that assist in locating and identifying a neighboring UAV node via scanning, such as GPS coordinates, altitude, temperature, link capabilities, etc.

In step 508, the realignment controller will broadcast the realignment plan to UAV nodes in the dynamic UAV network. In one embodiment, the realignment controller will broadcast the realignment plan to all of the UAV nodes in the dynamic UAV network. In another embodiment, the realignment controller will broadcast the realignment plan to the leader, who will in turn broadcast the realignment plan to the remaining UAV nodes in the dynamic UAV network. In another embodiment, the realignment controller will broadcast the realignment plan to the leader in addition to the UAV nodes that need to receive instructions as recited in the realignment plan.

In step 510, the leader will optionally wait for an opportunity for the dynamic UAV network to execute the realignment plan. For example, if the dynamic UAV network is experiencing a substantial volume of traffic, the leader may determine that it would be preferable to wait before executing the realignment plan until a time where there is less traffic. In another example, the leader will wait until some preconfigured time window to execute the realignment plan. For example, the preconfigured time may be executed at 3:00 AM because it is known that would be an optimal time to execute a realignment.

In step 512, the leader will notify the UAV nodes in the dynamic UAV network to execute the realignment plan. In another embodiment, the realignment plan is executed immediately, without waiting for a leader to notify the UAV nodes to execute the realignment plan. Each UAV node will execute its realignment instructions as specified in the realignment plan. In one embodiment, each UAV node executes its realignment instructions simultaneously so that the entire dynamic UAV network is reconfigured at one time. In another embodiment, each UAV node executes its realignment instructions serially one at a time until the entire realignment plan is executed, in order to avoid disrupting the entire dynamic UAV network all at once. In another embodiment, a subset of UAV nodes execute their realignment instructions, and then another subset, and so forth until the entire realignment plan is executed. After step 512 is completed, process 500 returns to step 504 in order to ensure that the dynamic UAV network is in a suitable configuration following the realignment, based on any intervening changes in conditions.

Figure 6A:
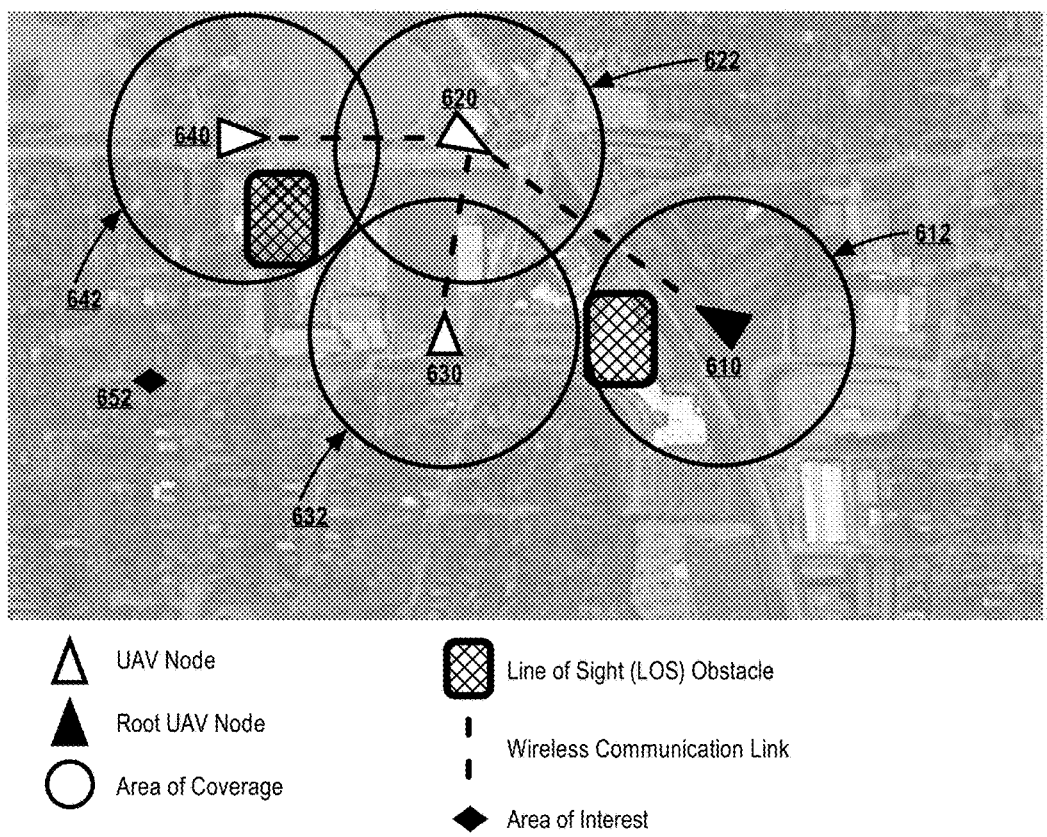
FIG. 6A, FIG. 6B, FIG. 6C, FIG. 6D show an aerial depiction of reconfiguring a dynamic UAV network, according to one embodiment.

FIG. 6A, FIG. 6B, FIG. 6C, FIG. 6D show an aerial depiction of reconfiguring a dynamic UAV network according to one embodiment. FIG. 6A depicts a dynamic UAV network. A root UAV node 610 is connected to a UAV node 620. UAV node 620 is connected to UAV node 640 and UAV node 630. Root UAV node 610 provides wireless area of coverage 612, UAV node 620 provides wireless area of coverage 622, UAV node 630 provides wireless area of coverage 632, and UAV node 640 provides wireless area of coverage 642. In this example, a new area of interest 652 has been identified, but is not covered by the dynamic UAV network. In response to detecting a network event (for example detecting a new area of interest 652), the dynamic UAV network can be reconfigured in order to provide coverage to the area of interest 652. In one embodiment, a realignment controller sends a realignment plan (not depicted) to the root UAV node 610 and to UAV nodes 620, 630 and 640 that includes instructions for UAV node 630 to change its position and orientation. Root UAV node 610 then notifies the remaining UAV nodes 620, 630, and 640 to execute the realignment plan.

Figure 6B:
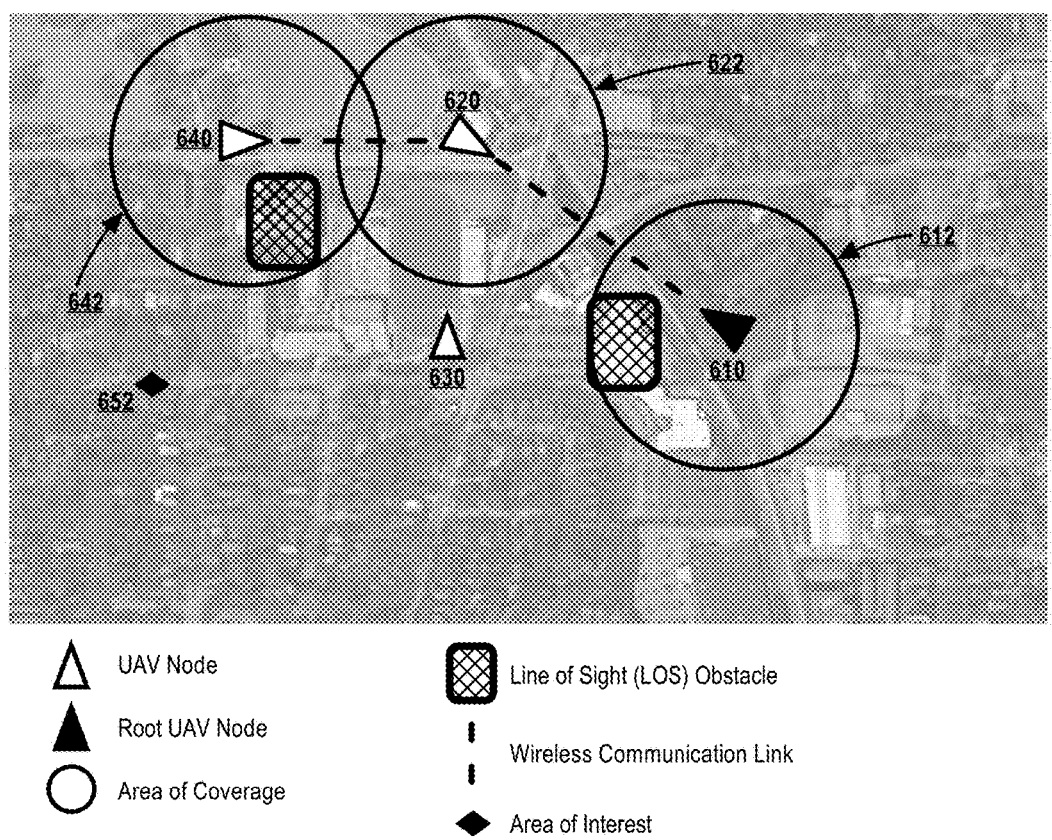
Figure 6C:
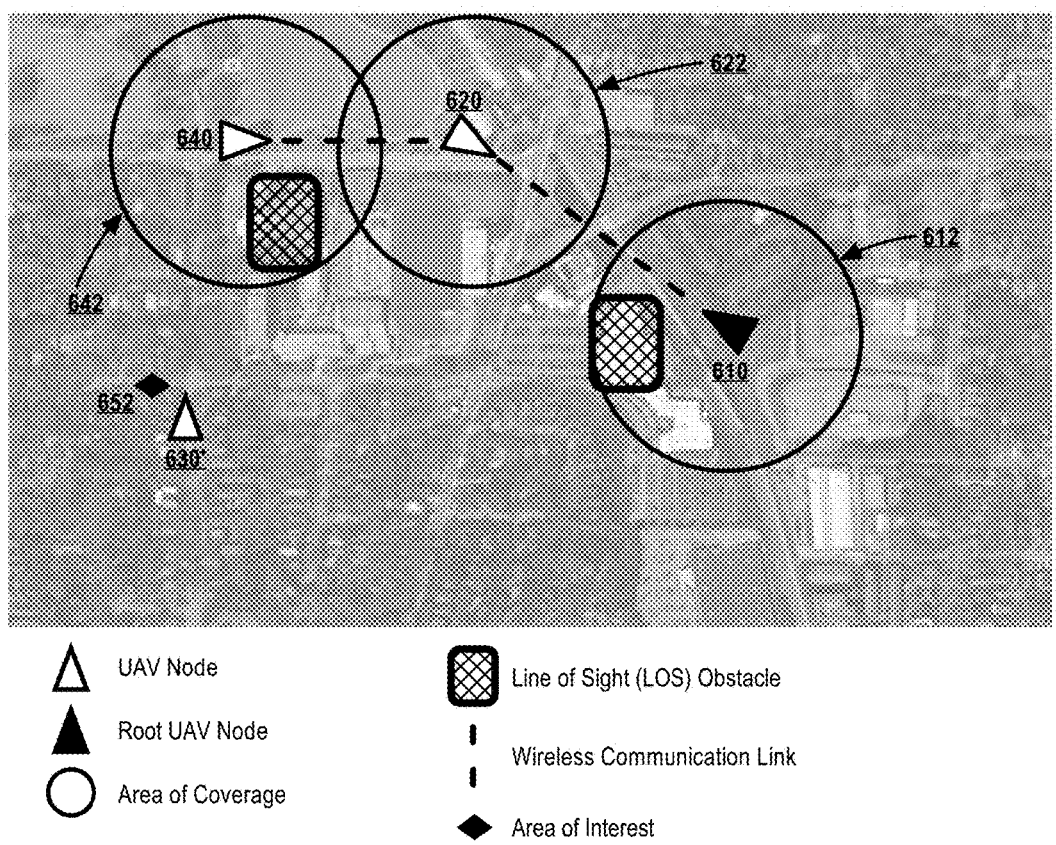
Figure 6D:
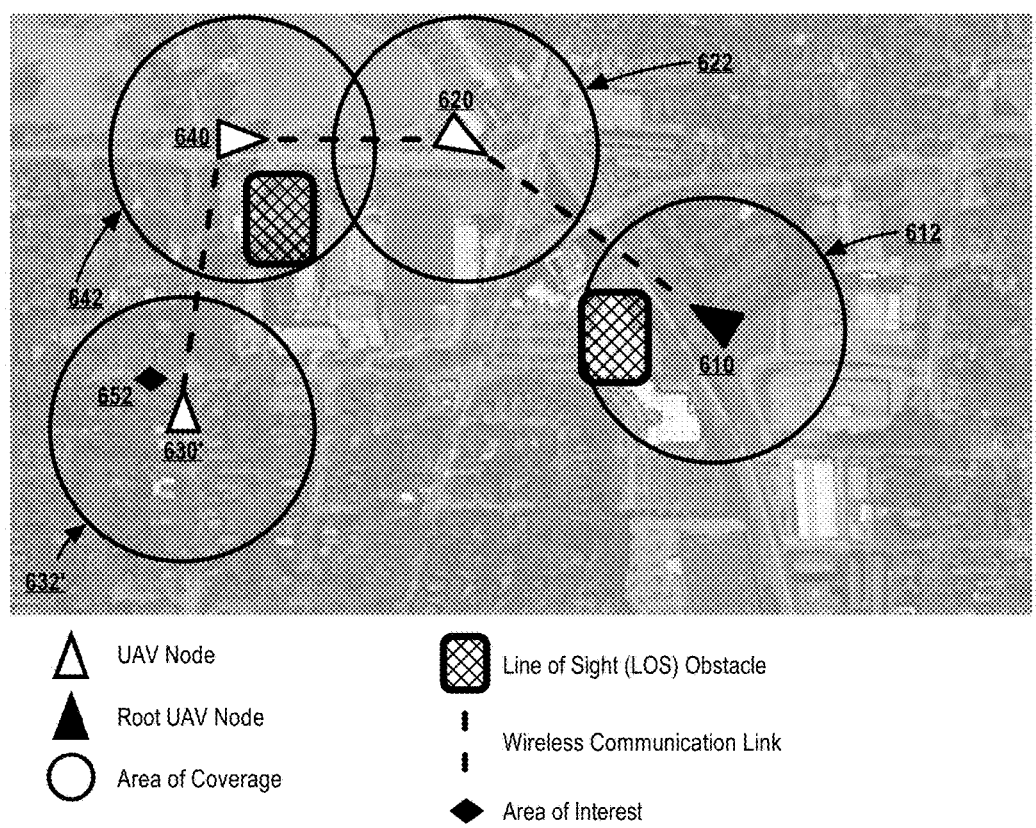

In FIG. 6B, UAV node 630 optionally disconnects its connection to UAV node 320 in order to change its position and orientation, per the instructions in the realignment plan. In FIG. 6C, UAV node 630 changes its position and orientation, per the instructions in the realignment plan, as shown by UAV node 630'. In FIG. 6D, UAV node 630' creates a connection to UAV node 340. Likewise, UAV node 630 provides area of coverage 632', which now provides connectivity to area of interest 652. Thus, by executing the realignment plan, the dynamic UAV network is able to dynamically change its configuration in response to a network event.

Figure 7A:
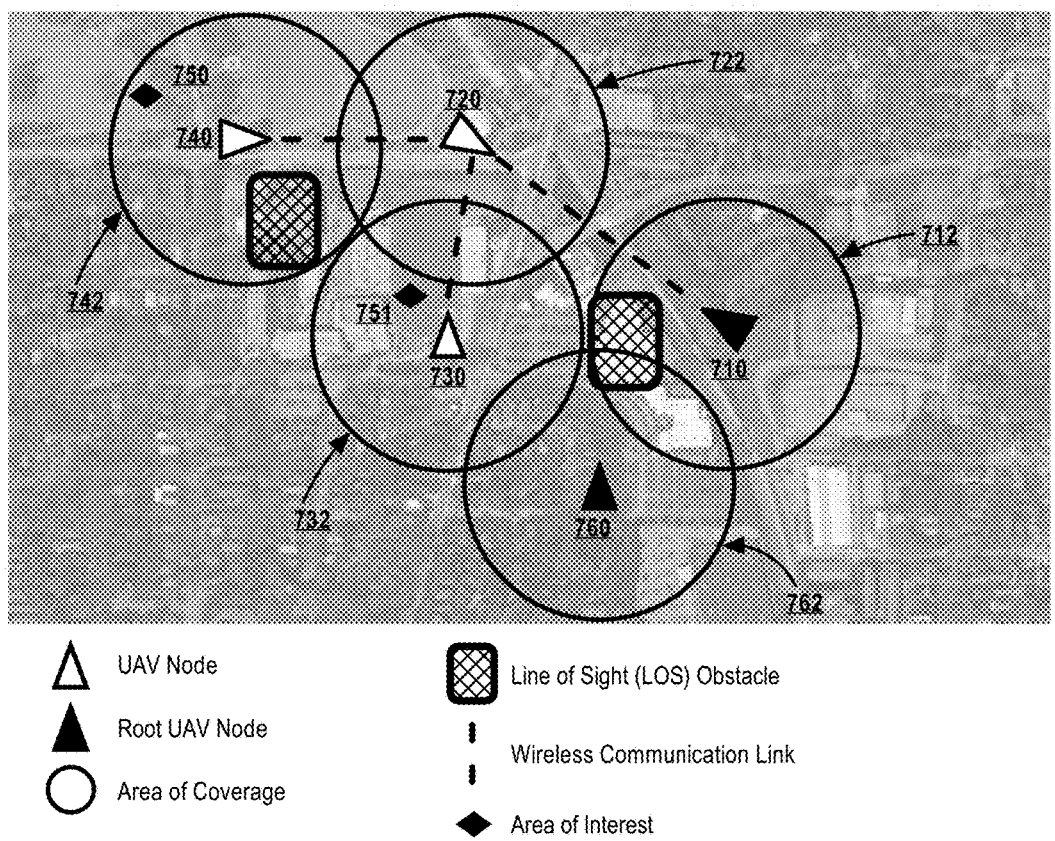
FIG. 7A, FIG. 7B, FIG. 7C show an aerial depiction of reconfiguring a dynamic UAV network, according to one embodiment.
Figure 7B:
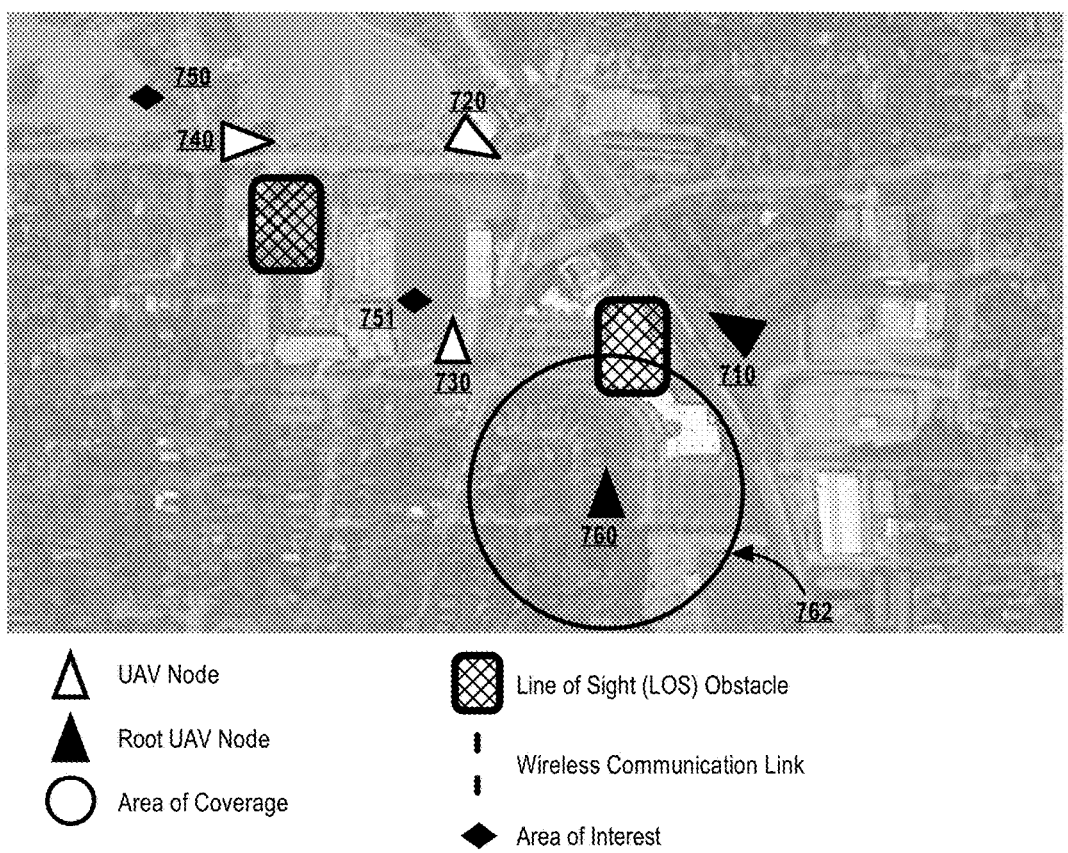
Figure 7C:
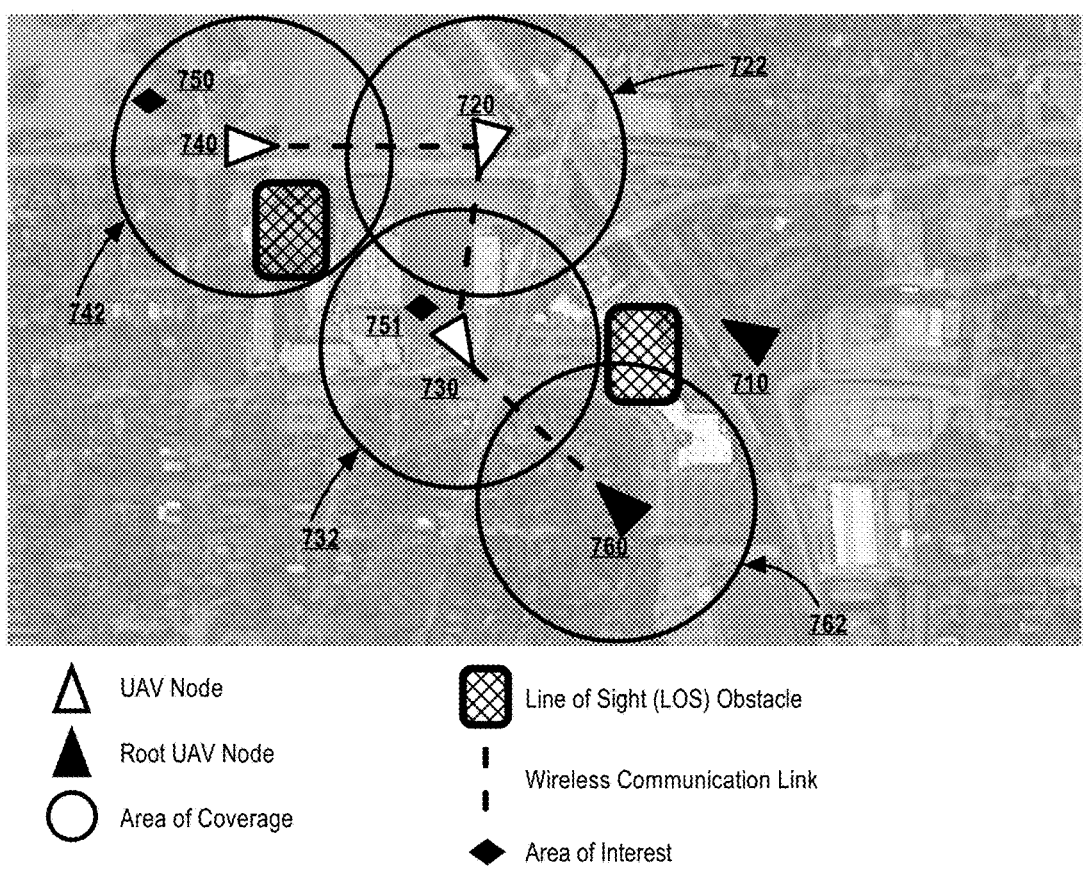

FIG. 7A, FIG. 7B, FIG. 7C show an aerial depiction of reconfiguring a dynamic UAV network according to another embodiment. FIG. 7A depicts a dynamic UAV network that includes two root UAV nodes 710 and 760. Root UAV node 710 is connected to UAV node 720. UAV node 720 is connected to UAV nodes 730 and 740. Root UAV node 720 provides wireless area of coverage 712, root UAV node 760 provides wireless area of coverage 662, UAV node 720 provides wireless area of coverage 722, UAV node 730 provides wireless area of coverage 732, and UAV node 740 provides wireless area of coverage 742. In this example, the dynamic UAV network is providing coverage to areas of interest 750 and 751.

In FIG. 7B, a network event is detected where the root UAV node 710 suffers a failure and is unable to provide a wireless coverage area 712 or a connection to UAV node 720. Since all link paths were previously routing to root UAV node 710, the failure of root UAV node 710 causes the additional connections in the dynamic UAV network to fail. In response, the realignment controller can send a realignment plan to the UAV nodes 720, 730, and 740, and root UAV nodes 710 and 760 to realign the configuration of the dynamic UAV network in order to ensure that areas of interest 750 and 751 receive connectivity. In one embodiment, the realignment controller sends a realignment plan to each of the nodes directly (not depicted), for example via a long range radio signal, such as LR 900 MHz or LR 433 MHz.

In FIG. 7C, the dynamic UAV network has been reconfigured according to the realignment plan. Specifically, in this case, the orientation of root UAV node 760, and UAV nodes 720 and 730 was modified in order to create connections between these links, thereby connecting the dynamic UAV network to a different root UAV 760 instead of root UAV node 710 that experienced failure. Thus, connectivity is restored for areas of interest 750 and 751 by execution of the realignment plan.

7. Example Applications

The techniques for deploying and reconfiguring a dynamic UAV network described herein can be used in many varied application areas that require the quick deployment of a network that can dynamically adapt to network events. For example, one application area for the techniques described herein is news media coverage. Field coverage by most news media agencies typically requires the use of an outdoor broadcasting van (OB van) that uses some sort of backhaul network communication (for example satellite or bonded cellular) to upload captured media footage from the field to their main office. In many situations, cellular networks are unavailable (for example disaster reporting) or are hyper-congested (for example sporting events, visits by heads of state or celebrities, etc.), thereby forcing the news media agency to rely on satellite uplinks from an OB van. A downside to this deployment is that the new media agency must deploy an OB van with each news crew in the field in order to have a satellite uplink. By using the techniques described herein, multiple news crews in the field can use the same OB van. The OB van can deploy a root UAV node that connects to multiple UAV nodes to generate a dynamic UAV network. Each field crew can upload their data via the dynamic UAV network to the OB van, which in turn can transmit via the satellite uplink. The configuration of the dynamic UAV network can dynamically change over time in order to ensure that the links in dynamic UAV network are reliable, and to ensure that areas of interest, such as the location of the news crews, have coverage.

Another application area for the techniques described herein is for disaster preparedness. In an emergency situation, such as an earthquake, a flood, tornado, nuclear leak, search and rescue operation, etc., a team of first responders is often trying to assess the situation and provide help to victims in the affected area. In the aftermath of a disaster, core communication infrastructure in the area may be affected by the disaster, such as cellular congestion, power outages, etc. By using the techniques described herein, first responders, such as fire departments, police, and medical professionals, can deploy an on-demand communication infrastructure via a dynamic UAV network to improve communication amongst first responders and to improve communication with remote teams. Additionally, the deployment of a dynamic UAV network can assist in finding victims who may not be able to communicate with first responders via traditional channels, but the victims can use the dynamic UAV network to contact first responders. The configuration of the dynamic UAV network can dynamically change over time in order to ensure that the links in dynamic UAV network are reliable, and to ensure that areas of interest, such as the location of the first responders or victims, have coverage.

Another application area for the techniques described herein is to provide infrastructure bridges to patch existing communication infrastructure for a service provider. Service providers, such as cellular service providers, internet service providers, and radio stations sometimes experience gaps in their coverage that may be caused by an event, such as the failure of a piece of infrastructure. The techniques described herein can allow a service provider to quickly deploy a dynamic UAV network that can help supplement their existing coverage. For example, a dynamic UAV network can be deployed to allow a repair team to fix a piece of equipment that has failed without disruption of coverage for customers. The configuration of the dynamic UAV network can dynamically change over time in order to ensure that the links in dynamic UAV network are reliable, and to ensure that areas of interest have coverage.

Another application area for the techniques described herein is to provide a temporary or long-term network infrastructure for commercial UAVs. Commercial UAVs are UAVs that are deployed for commercial purposes. Examples of commercial UAVs include but are not limited to package delivery UAVs, three dimensional imaging and mapping, security surveillance, agricultural monitoring of fields, meteorology, construction, real estate assessment, etc. The techniques described herein can be used to deploy a private dynamic UAV network to provide network connectivity and data transmission capabilities for existing commercial UAV deployments.

8. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
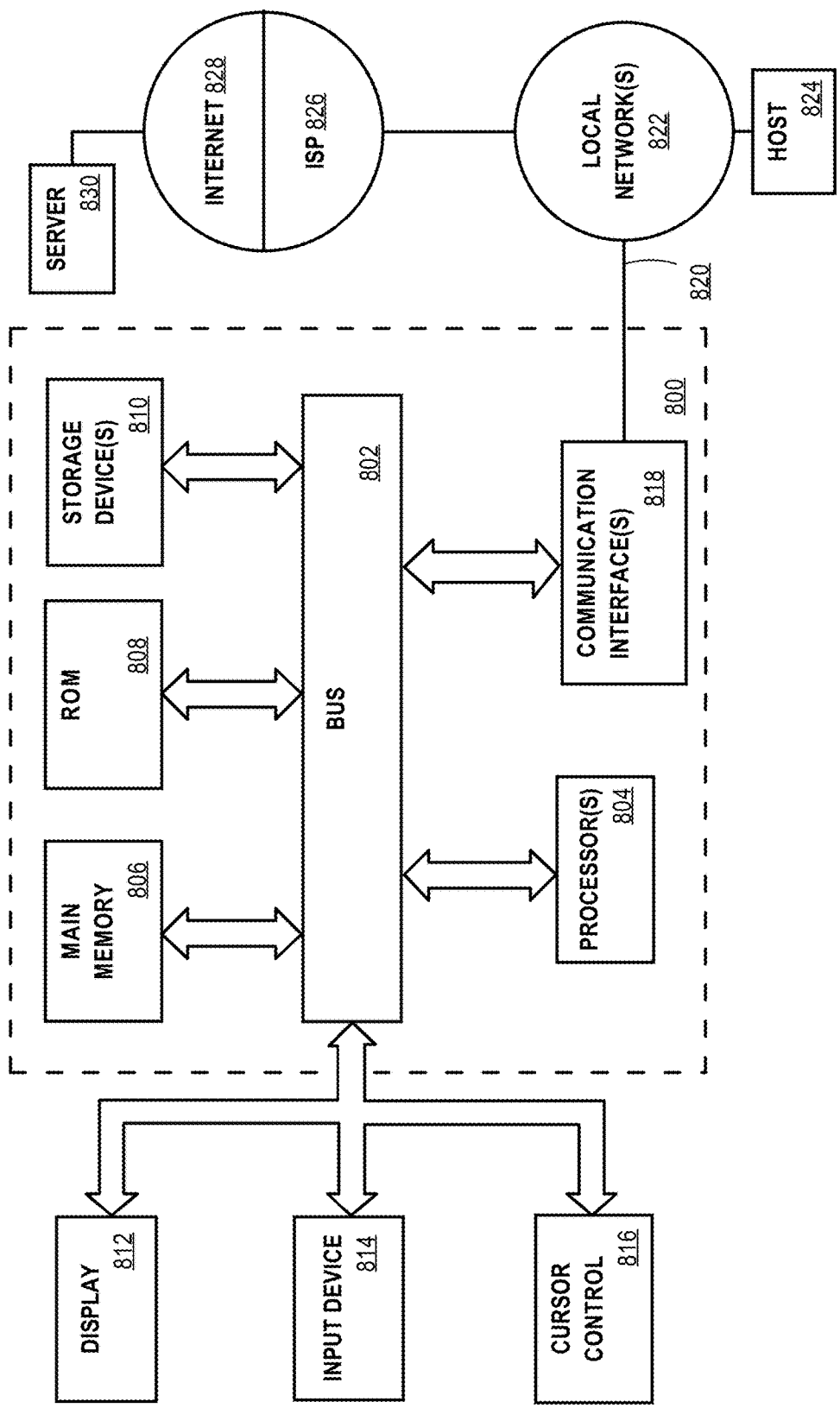
FIG. 8 is a block diagram of a computing device in which the example embodiment(s) of the present invention may be embodied.

Referring now to FIG. 8, it is a block diagram that illustrates a basic computing device 800 in which the example embodiment(s) of the present invention may be embodied. Computing device 800 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 800 may include a bus 802 or other communication mechanism for addressing main memory 806 and for transferring data between and among the various components of device 800.

Computing device 800 may also include one or more hardware processors 804 coupled with bus 802 for processing information. A hardware processor 804 may be a general purpose microprocessor, a system on a chip (SoC), or other processor.

Main memory 806, such as a random access memory (RAM) or other dynamic storage device, also may be coupled to bus 802 for storing information and software instructions to be executed by processor(s) 804. Main memory 806 also may be used for storing temporary variables or other intermediate information during execution of software instructions to be executed by processor(s) 804.

Software instructions, when stored in storage media accessible to processor(s) 804, render computing device 800 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 800 also may include read only memory (ROM) 808 or other static storage device coupled to bus 802 for storing static information and software instructions for processor(s) 804.

One or more mass storage devices 810 may be coupled to bus 802 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 810 (for example, the main hard disk for the device) stores a body of program and data for directing operation of the computing device, including an operating system, user application programs, driver and other support files, as well as other data files of all sorts.

Computing device 800 may be coupled via bus 802 to display 812, such as a liquid crystal display (LCD) or other electronic visual display, for displaying information to a computer user. In some configurations, a touch sensitive surface incorporating touch detection technology (for example, resistive, capacitive, etc.) may be overlaid on display 812 to form a touch sensitive display for communicating touch gesture (for example, finger or stylus) input to processor(s) 804.

An input device 814, including alphanumeric and other keys, may be coupled to bus 802 for communicating information and command selections to processor 804. In addition to or instead of alphanumeric and other keys, input device 814 may include one or more physical buttons or switches such as, for example, a power (on/off) button, a "home" button, volume control buttons, or the like.

Another type of user input device may be a cursor control 816, such as a mouse, a trackball, or cursor direction keys for communicating direction information and command selections to processor 804 and for controlling cursor movement on display 812. This input device typically has two degrees of freedom in two axes, a first axis (for example, x) and a second axis (for example, y), that allows the device to specify positions in a plane.

While in some configurations, such as the configuration depicted in FIG. 8, one or more of display 812, input device 814, and cursor control 816 are external components (i.e., peripheral devices) of computing device 800, some or all of display 812, input device 814, and cursor control 816 are integrated as part of the form factor of computing device 800 in other configurations.

Functions of the disclosed systems, methods, and modules may be performed by computing device 800 in response to processor(s) 804 executing one or more programs of software instructions contained in main memory 806. Such software instructions may be read into main memory 806 from another storage medium, such as storage device(s) 810. Execution of the software instructions contained in main memory 806 cause processor(s) 804 to perform the functions of the example embodiment(s).

While functions and operations of the example embodiment(s) may be implemented entirely with software instructions, hard-wired or programmable circuitry of computing device 800 (for example, an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more software instructions to processor(s) 804 for execution. For example, the software instructions may initially be carried on a magnetic disk or solid-state drive of a remote computer. The remote computer can load the software instructions into its dynamic memory and send the software instructions over a telephone line using a modem. A modem local to computing device 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor(s) 804 retrieves and executes the software instructions. The software instructions received by main memory 806 may optionally be stored on storage device(s) 810 either before or after execution by processor(s) 804.

Computing device 800 also may include one or more communication interface(s) 818 coupled to bus 802. A communication interface 818 provides a two-way data communication coupling to a wired or wireless network link 820 that is connected to a local network 822 (for example, Ethernet network, Wireless Local Area Network, cellular phone network, Bluetooth wireless network, or the like). Communication interface 818 sends and receives electrical, electromagnetic, or optical signals that carry digital data streams representing various types of information. For example, communication interface 818 may be a wired network interface card, a wireless network interface card with an integrated radio antenna, or a modem (for example, ISDN, DSL, or cable modem).

Network link(s) 820 typically provide data communication through one or more networks to other data devices. For example, a network link 820 may provide a connection through a local network 822 to a host computer 824 or to data equipment operated by an Internet Service Provider (ISP) 826. ISP 826 in turn provides data communication services through the world wide packet data communication network now commonly referred to as the "Internet" 828. Local network(s) 822 and Internet 828 use electrical, electromagnetic or optical signals that carry digital data streams. The signals through the various networks and the signals on network link(s) 820 and through communication interface(s) 818, which carry the digital data to and from computing device 800, are example forms of transmission media.

Computing device 800 can send messages and receive data, including program code, through the network(s), network link(s) 820 and communication interface(s) 818. In the Internet example, a server 830 might transmit a requested code for an application program through Internet 828, ISP 826, local network(s) 822 and communication interface(s) 818.

The received code may be executed by processor 804 as it is received, and/or stored in storage device 810, or other non-volatile storage for later execution.

9. Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
using a plurality of unmanned aerial vehicles (UAVs), establishing a UAV network among the plurality of UAVs that is programmed to communicate packet data, wherein the plurality of UAVs comprises a first UAV;
creating a first wireless connection between the first UAV of the plurality of UAVs and a second UAV, which is different than the plurality of UAVs;
receiving a first signal indicating that the second UAV has been added to the plurality of UAVs;
transmitting a second signal to the second UAV, the second signal causing, when received by the second UAV, the second UAV to generate a wireless coverage area that extends a wireless range of the UAV network;
for each particular UAV in the plurality of UAVs, calculating a plurality of link cost values for wireless connections to or from each particular UAV to other UAVs in the plurality of UAVs and the wireless connections comprising at least the first wireless connection and a second wireless connection wherein each of the first wireless connection and the second wireless connection implements a different one of a Wi-Fi connection, a long-range 900 MHz radio connection or a long-range 433 MHz radio connection; and
realigning the plurality of UAVs based on the plurality of link cost values.

2. The method of claim 1, wherein the realigning the plurality of UAVs comprises:
transmitting the plurality of link cost values to a realignment controller;
using the realignment controller to compare one or more of the plurality of link cost values to one or more threshold settings; and
in response to determining that one or more link cost values of the plurality of link cost values exceed the one or more threshold settings, determining a realignment plan that provides realignment instructions to one or more UAVs of the plurality of UAVs.

3. The method of claim 2, further comprising:
transmitting the realignment plan to-one or more UAVs of the plurality of UAVs; and
wherein the realignment instructions, when executed by the one or more UAVs of the plurality of UAVs, cause the one or more UAVs of the plurality of UAVs to execute the realignment instructions.

4. The method of claim 2, wherein the realignment instructions comprise one or more of:
a program instruction which when executed causes a change of a position of one or more UAVs of the plurality of UAVs;
a program instruction which when executed causes a change of an orientation of one or more UAVs of the plurality of UAVs; and
a program instruction which when executed, causes a change of an altitude of one or more UAVs of the plurality of UAVs.

5. The method of claim 1, the method further comprising:
detecting a network event;
in response to detecting the network event, for each particular UAV in the plurality of UAVs: calculating a second plurality of link cost values for one or more wireless connections to or from each particular UAV to the other UAVs in the plurality of UAVs; and
realigning the plurality of UAVs based on the second plurality of link cost values.

6. The method of claim 5, wherein detecting the network event comprises one of:
detecting a failure of one of the plurality of UAVs; and
detecting a change to a weather condition.

7. The method of claim 1, wherein each wireless connection of the wireless connections uses a different transport protocol.

8. The method of claim 1, wherein the plurality of UAVs further comprises a root UAV node, wherein the root UAV node is coupled to a base station via a wired tether.

9. The method of claim 8, further comprising analyzing the plurality of link cost values to determine a communication route from the second UAV to the root UAV node, wherein the communication route comprises a plurality of wireless connections from a subset of the plurality of UAVs.

10. The method of claim 9, further comprising transmitting a data packet to the second UAV, wherein, when the data packet is received by the second UAV causes the second UAV to perform analyzing the plurality of link cost values.

11. A networking system comprising:
a plurality of computers;
one or more non-transitory data storage media in the plurality of computers storing logic comprising one or more sequences of instructions which when executed cause the plurality of computers to perform:
using a plurality of unmanned aerial vehicles (UAVs), establishing a UAV network among the plurality of UAVs that is programmed to communicate packet data, wherein the plurality of UAVs comprises a first UAV;
creating a first wireless connection between the first UAV of the plurality of UAVs and a second UAV, which is different than the plurality of UAVs;
receiving a first signal indicating that the second UAV has been added to the plurality of UAVs;
transmitting a second signal to the second UAV, the second signal causing, when received by the second UAV, the second UAV to generate a wireless coverage area that extends a wireless range of the UAV network;
for each particular UAV in the plurality of UAVs, calculating a plurality of link cost values for wireless connections to or from each particular UAV to other UAVs in the plurality of UAVs and the wireless connections comprising at least the first wireless connection and a second wireless connection wherein each of the first wireless connection and the second wireless connection implements a different one of a Wi-Fi connection, a long-range 900 MHz radio connection or a long-range 433 MHz radio connection; and
realigning the plurality of UAVs based on the plurality of link cost values.

12. The networking system of claim 11, wherein the sequence of instructions for realigning the plurality of networked UAVs comprises additional instructions which when executed cause the plurality of computers to perform:
transmitting the plurality of link cost values to a realignment controller;
using the realignment controller to compare one or more of the plurality of link cost values to one or more threshold settings; and
in response to determining that one or more link cost values of the plurality of link cost values exceed the one or more threshold settings, determining a realignment plan that provides realignment instructions to one or more UAVs of the plurality of UAVs.

13. The networking system of claim 12, further comprising one or more sequences of instructions which when executed cause the plurality of computers to perform:

transmitting the realignment plan to one or more UAVs of the plurality of UAVs; and wherein the realignment instructions, when executed by the one or more UAVs of the plurality of UAVs, cause the one or more UAVs of the plurality of UAVs to execute the realignment instructions.

14. The method of claim 2, wherein the realignment instructions comprise one or more of:
- a program instruction which when executed causes a change of a position of one or more UAVs of the plurality of UAVs;
- a program instruction which when executed causes a change of an orientation of one or more UAVs of the plurality of UAVs; and
- a program instruction which when executed, causes a change of an altitude of one or more UAVs of the plurality of UAVs.

15. The networking system of claim 11, further comprising one or more sequences of instructions which when executed cause the plurality of computers to perform:
- detecting a network event;
- in response to detecting the network event, for each particular UAV in the plurality of UAVs: calculating a second plurality of link cost values for one or more wireless connections to or from each particular UAV to the other UAVs in the plurality of UAVs; and
- realigning the plurality of UAVs based on the second plurality of link cost values.

16. The networking system of claim 15, wherein the sequence of instructions for detecting a network event comprises additional instructions which when executed cause the plurality of computers to perform one of:
- detecting a failure of one of the plurality of UAVs; and
- detecting a change to a weather condition.

17. The networking system of claim 11, wherein each wireless connection of the wireless connections uses a different transport protocol.

18. The networking system of claim 11, wherein the plurality of UAVs further comprises a root UAV node, wherein the root UAV node is coupled to a base station via a wired tether.

19. The networking system of claim 18, further comprising one or more sequences of instructions which when executed cause the plurality of computers to perform analyzing the plurality of link cost values to determine a communication route from the second UAV to the root UAV node, wherein the communication route comprises a plurality of wireless connections from a subset of the plurality of UAVs.

20. The networking system of claim 19, further comprising one or more sequences of instructions which when executed cause the plurality of computers to perform transmitting a data packet to the second UAV, wherein, when the data packet is received by the second UAV causes the second UAV to perform analyzing the plurality of link cost values.

* * * * *